(12) United States Patent
Yamaguchi

(10) Patent No.: US 9,262,614 B2
(45) Date of Patent: Feb. 16, 2016

(54) IMAGE PROCESSING DEVICE, IMAGE PROCESSING METHOD, AND STORAGE MEDIUM STORING IMAGE PROCESSING PROGRAM

(71) Applicant: FUJITSU LIMITED, Kawasaki-shi, Kanagawa (JP)

(72) Inventor: Nobuyasu Yamaguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 253 days.

(21) Appl. No.: 13/956,738

(22) Filed: Aug. 1, 2013

(65) Prior Publication Data

US 2014/0112553 A1   Apr. 24, 2014

(30) Foreign Application Priority Data

Oct. 19, 2012  (JP) .................................. 2012-231847

(51) Int. Cl.
   *G06K 9/00*   (2006.01)
   *G06F 21/32*  (2013.01)
(52) U.S. Cl.
   CPC ............ *G06F 21/32* (2013.01); *G06K 9/00234* (2013.01); *G06K 9/00288* (2013.01); *G06K 9/00362* (2013.01); *G06F 2221/2139* (2013.01)
(58) Field of Classification Search
   CPC ................................................ G06K 9/00268
   USPC ....................................................... 382/118
   See application file for complete search history.

(56) References Cited

U.S. PATENT DOCUMENTS

| | | | |
|---|---|---|---|
| 6,711,293 B1 | 3/2004 | Lowe | |
| 8,345,921 B1 * | 1/2013 | Frome et al. ................. | 382/103 |
| 9,032,490 B1 * | 5/2015 | Khitrenovich et al. ........... | 726/5 |
| 2006/0053155 A1 * | 3/2006 | Suga ............................. | 707/102 |
| 2006/0187305 A1 * | 8/2006 | Trivedi et al. ................. | 348/169 |
| 2007/0113099 A1 | 5/2007 | Takikawa et al. | |

(Continued)

FOREIGN PATENT DOCUMENTS

| | | |
|---|---|---|
| EM | 2 701 096 A2 | 2/2014 |
| JP | 2010-26959 | 2/2010 |

OTHER PUBLICATIONS

Soft Biometric Traits for Continuous User Authentication. Koichiro Niinuma, Unsang Park, and Anil K. Jain. Dec. 2010.*

(Continued)

*Primary Examiner* — Stephen R Koziol
*Assistant Examiner* — Delomia L Gilliard
(74) *Attorney, Agent, or Firm* — Staas & Halsey LLP

(57) ABSTRACT

An image processing device includes a processor; and a memory which stores a plurality of instructions, which when executed by the processor, cause the processor to execute, acquiring a captured image; extracting a first feature amount and a second feature amount of a user included in the image, and a third feature amount indicative of a likelihood of a portion from which the second feature amount is extracted; generating an authentication table including a plurality of the first feature amounts, a plurality of the second feature amounts, and a plurality of the third feature amounts extracted from a plurality of the images; and selecting the third feature amount extracted at authentication of the user, and the first feature amount and the second feature amount included in the authentication table, based on the third feature amount included in the authentication table, and authenticating the user based on the first feature amount.

20 Claims, 21 Drawing Sheets

(56) References Cited

U.S. PATENT DOCUMENTS

2013/0247175 A1* 9/2013 Nechyba et al. ............... 726/19
2014/0056487 A1 2/2014 Suzuki et al.

OTHER PUBLICATIONS

Continuous Verification Using Multimodal Biometrics. Terence Sim, Sheng Zhang, Rajkumar Janakiraman, and Sandeep Kumar. Apr. 2007.*
Integrating Faces, Fingerprints, and Soft Biometric Traits for User Recognition. Anil K. Jain, Karthik Nandakumar, Xiaoguang Lu, and Unsang Park. May 2004.*
T. Kailath, "The Divergence and Bhattacharyya Distance Measures in Signal Direction," *IEEE Transactions on Communication Technology, Stanford University & Stanford Research Institute*, vol. 15, No. 1, Feb. 1967, pp. 52-60.
L. Sirovich et al., "Low-dimensional procedure for the characterization of human faces," *J. Opt. Soc. Am.*, Optical Society of America, vol. 4, No. 3, Mar. 1987, pp. 519-524.
F. Monrose et al., "Keystroke dynamics as a biometric for authentication," *Future Generation Computer Systems*, No. 16, 2000, pp. 351-359.
P. Viola et al., "Rapid Object Detection using a Boosted Cascade of Simple Features," *Proceedings of the 2001 IEEE Computer Society Conference on Computer Vision and Pattern Recognition*, IEEE Computer Society, 2001, pp. 1-8.
A. Altinok et al., "Temporal Integration for Continuous Multimodal Biometrics," *Proceedings of the Workshop on Multimodal User Authentication*, University of California, Santa Barbara, 2003, pp. 1-7.
T. Sim et al., "Continuous Verification Using Multimodal Biometrics," *IEEE Transactions on Pattern Analysis and Machine Intelligence*, IEEE Computer Society, vol. 29, No. 4, Apr. 2007, pp. 687-700.
H. Bay et al., "Speeded-Up Robust Features (SURF,)" *Computer Vision and Image Understanding*, No. 110, 2008, pp. 346-359.
K. Niinuma et al., "Soft Biometric Traits for Continuous User Authentication," *IEEE Transactions on Information Forensics and Security*, IEEE, vol. 5., No. 4, Dec. 2010, pp. 771-780.
Extended European Search Report issued Nov. 3, 2015 in corresponding European patent application No. 13179229.3.
Anil K. Jain et al., "Landscape of Clustering Algorithms", Computer Society, Proceedings of the $17^{th}$ Internationals Conference on Pattern Recognition (ICPR'04), Aug. 23-26, 2004, IEEE, XP10724215A, 4 pages.
Ajita Rattani et al., "Template Update Methods in Adaptive Biometric Systems: A Critical Review", M. Tistarelli and M.S. Nixon (Eds.): ICB 2009, LNCS 5558, 2009, XP019118000, pp. 847-859.
Soumen Bag et al., "An Efficient Face Recognition Approach using PCA and Minimum Distance Classifier", 2011 International Conference on Image Information Processing (ICIIP 2011), Proceedings of the 2011 International Conference on Image Information Processing, IEEE, XP032078279, pp. 1-6.
Muhammad Khurram Khan et al., "Biometric Driven System for Passive Continuous Authentication", Information Assurance and Security (IAS), 2011 $7^{th}$ International Conference, IEEE, Dec. 5, 2011, XP032088417, pp. 139-144.
Umut Uludag et al., "Biometric template selection and update: a case study in fingerprints", Pattern Recognition 37 (2004), XP004508402, pp. 1533-1542.

* cited by examiner

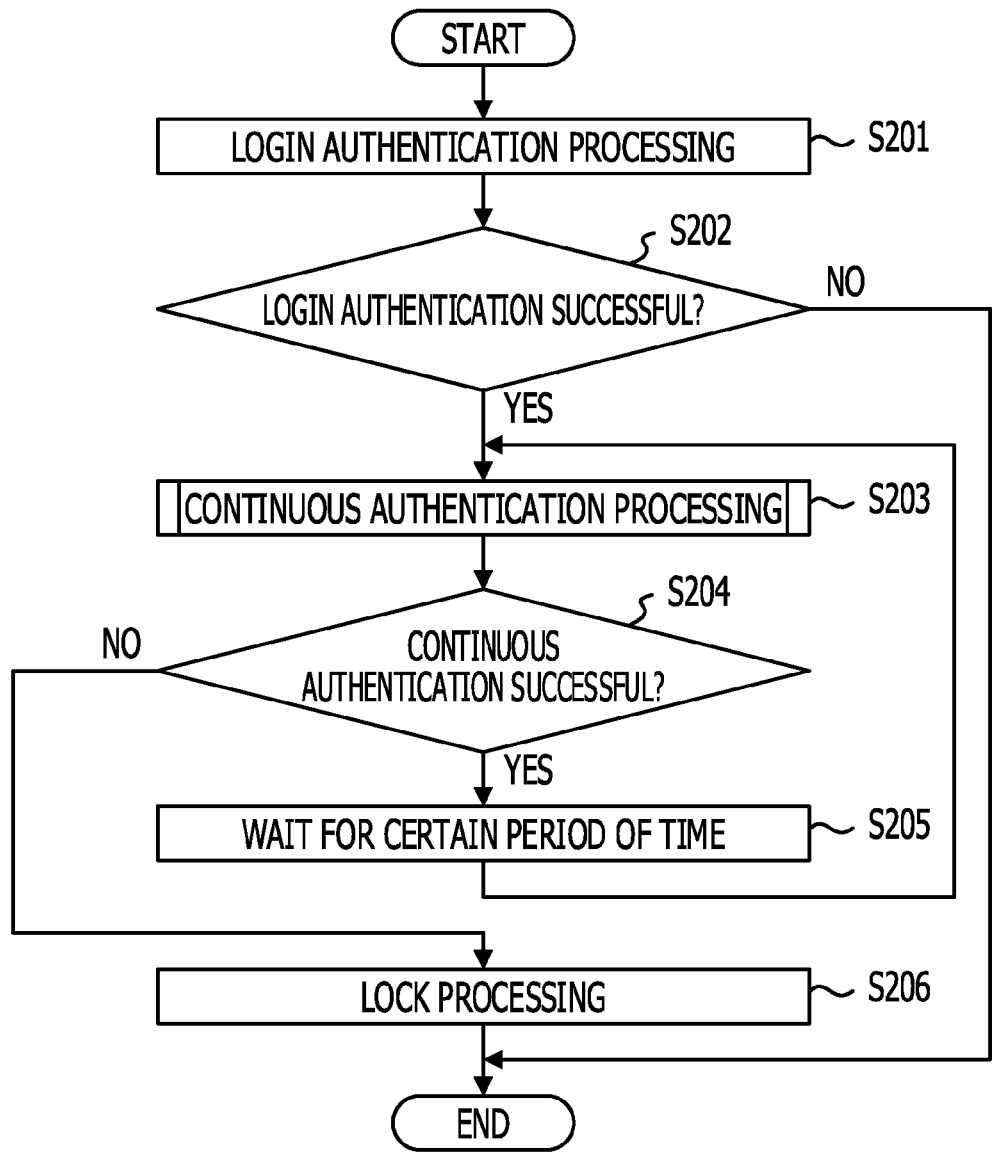

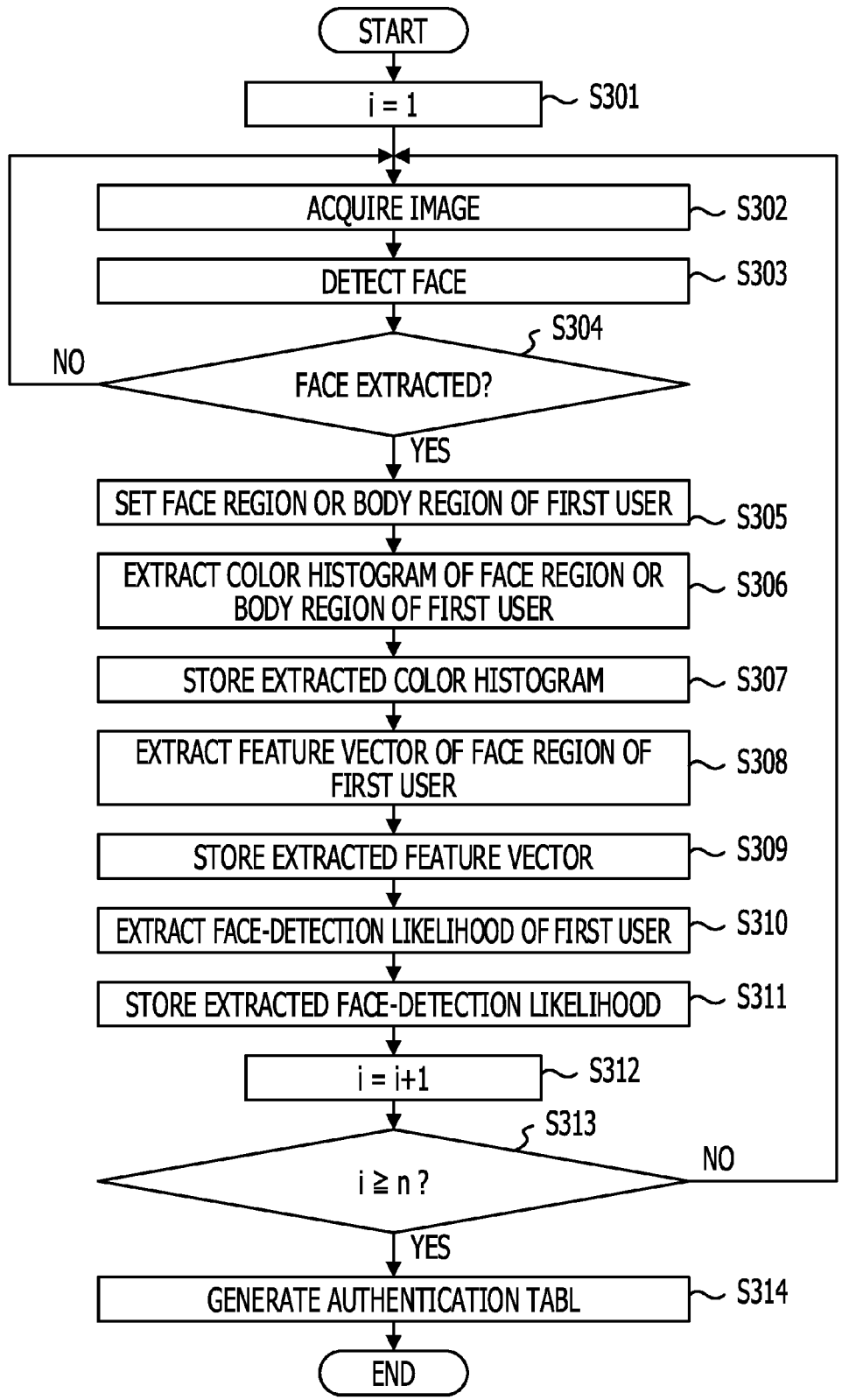

FIG. 4A
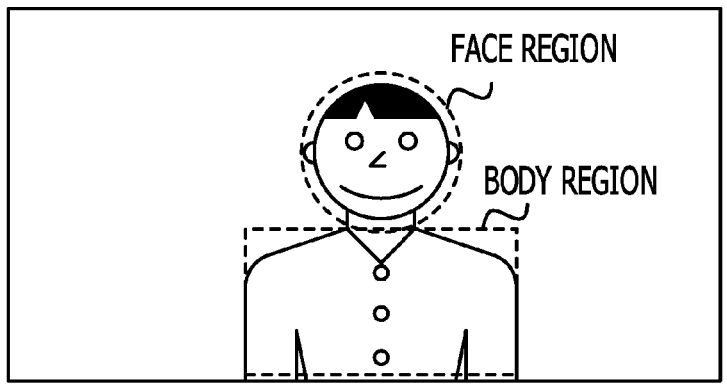
FIG. 4B
| REGION SHAPE, POSITIONAL INFORMATION | SUBJECT REGION | BODY REGION |
|---|---|---|
| | SHAPE | RECTANGLE |
| | CENTER (x, y) | (200, 200) |
| | WIDTH | 200 |
| | HEIGHT | 150 |
| COLOR HISTOGRAM (R, G, B) | (15, 15, 15) | 0.01 |
| | (31, 15, 15) | 0.005 |
| | ... | ... |
| | (255, 255, 255) | 0.001 |
FIG. 4C
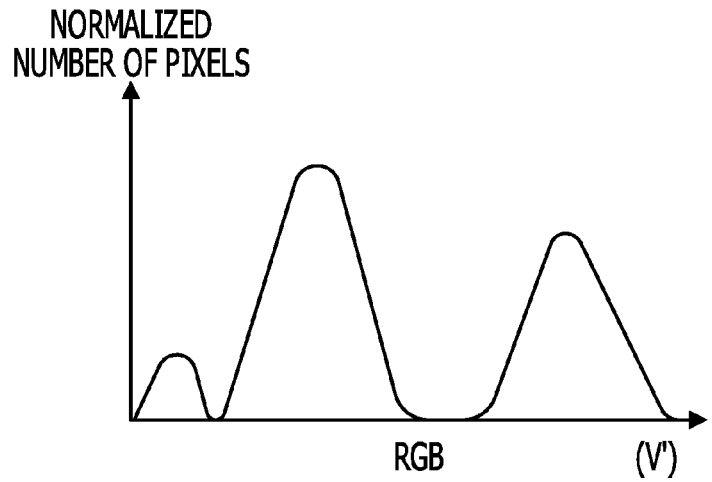

FACE REGION
(x, y: FEATURE POINT)

| REGION SHAPE, POSITIONAL INFORMATION | SUBJECT REGION | | FACE REGION | |
|---|---|---|---|---|
| | SHAPE | | CIRCLE | |
| | CENTER (x, y) | | (200, 100) | |
| | WIDTH | | 100 | |
| | HEIGHT | | 150 | |
| FACE-DETECTION LIKELIHOOD | LIKELIHOOD (%) | | | |
| | 98 | | | |
| FEATURE VECTOR | FEATURE VECTOR ID | POSITION (x, y) | DIRECTION (DEGREE) | FEATURE VECTOR (128 DIMENSIONS) |
| | 1 | (130, 70) | 24.3 | 0.441, 0.319, 0.929,... |
| | 2 | (150, 150) | 95.4 | 0.934, 0.713, 0.663,... |
| | ... | ... | ... | ... |
| | N | (235, 65) | 67.1 | 0.277, 0.393, 0.277,... |

FIG. 6

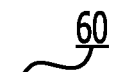

| IMAGE ID | FACE-DETECTION LIKELIHOOD | COLOR HISTOGRAM | FEATURE VECTOR |
|---|---|---|---|
| 1 | 91% | histgram01 | vector01 |
| 2 | 92% | histgram02 | vector02 |
| 3 | 85% | histgram03 | vector03 |
| 4 | 95% | histgram04 | vector04 |
| 5 | 88% | histgram05 | vector05 |
| 6 | 93% | histgram06 | vector06 |
| 7 | 77% | histgram07 | vector07 |
| 8 | 98% | histgram08 | vector08 |
| 9 | 83% | histgram09 | vector09 |
| 10 | 97% | histgram10 | vector10 |
| 11 | 93% | histgram11 | vector11 |
| 12 | 75% | histgram12 | vector12 |
| 13 | 92% | histgram13 | vector13 |
| 14 | 84% | histgram14 | vector14 |
| 15 | 97% | histgram15 | vector15 |
| 16 | 82% | histgram16 | vector16 |
| 17 | 99% | histgram17 | vector17 |
| 18 | 73% | histgram18 | vector18 |
| 19 | 94% | histgram19 | vector19 |
| 20 | 81% | histgram20 | vector20 |

FIG. 7

| FIRST GROUP ID | IMAGE ID | FACE-DETECTION LIKELIHOOD | COLOR HISTOGRAM | FEATURE VECTOR |
|---|---|---|---|---|
| 1-A | 1 | 91% | histgram01 | vector01 |
| 1-A | 2 | 92% | histgram02 | vector02 |
| 1-A | 4 | 95% | histgram04 | vector04 |
| 1-A | 6 | 93% | histgram06 | vector06 |
| 1-A | 8 | 98% | histgram08 | vector08 |
| 1-A | 10 | 97% | histgram10 | vector10 |
| 1-A | 11 | 93% | histgram11 | vector11 |
| 1-A | 13 | 92% | histgram13 | vector13 |
| 1-A | 15 | 97% | histgram15 | vector15 |
| 1-A | 17 | 99% | histgram17 | vector17 |
| 1-A | 19 | 94% | histgram19 | vector19 |
| 1-B | 3 | 85% | histgram03 | vector03 |
| 1-B | 5 | 88% | histgram05 | vector05 |
| 1-B | 9 | 83% | histgram09 | vector09 |
| 1-B | 14 | 84% | histgram14 | vector14 |
| 1-B | 16 | 82% | histgram16 | vector16 |
| 1-B | 20 | 81% | histgram20 | vector20 |
| 1-C | 7 | 77% | histgram07 | vector07 |
| 1-C | 12 | 75% | histgram12 | vector12 |
| 1-C | 18 | 73% | histgram18 | vector18 |

| IMAGE ID | FIRST GROUP ID | SECOND GROUP ID | FIRST SIMILARITY | | | | | | | | | |
|---|---|---|---|---|---|---|---|---|---|---|---|---|
| | | | 1 | 2 | 4 | 6 | 8 | 10 | 11 | 13 | 15 | 17 | 19 |
| 1 | 1-A | | TBD | 65% | 95% | 34% | 96% | 72% | 93% | 68% | 98% | 72% | 92% |
| 2 | | | 65% | TBD | 70% | 95% | 55% | 97% | 67% | 71% | 64% | 58% | 75% |
| 4 | | | 95% | 70% | TBD | 46% | 95% | 74% | 92% | 69% | 97% | 58% | 95% |
| 6 | | | 34% | 95% | 46% | TBD | 59% | 95% | 63% | 54% | 79% | 63% | 72% |
| 8 | | | 96% | 55% | 95% | 59% | TBD | 78% | 96% | 71% | 96% | 63% | 97% |
| 10 | | | 72% | 97% | 74% | 95% | 78% | TBD | 51% | 69% | 58% | 67% | 71% |
| 11 | | | 93% | 67% | 92% | 63% | 96% | 51% | TBD | 74% | 93% | 69% | 96% |
| 13 | | | 68% | 71% | 69% | 54% | 71% | 69% | 74% | TBD | 56% | 91% | 72% |
| 15 | | | *98%* | 64% | 97% | 79% | 96% | 58% | 93% | 56% | TBD | 67% | 95% |
| 17 | | | 72% | 58% | 58% | 63% | 63% | 67% | 69% | 91% | 67% | TBD | 55% |
| 19 | | | 92% | 75% | 95% | 72% | 97% | 71% | 96% | 72% | 95% | 55% | TBD |

| IMAGE ID | | FIRST GROUP ID | SECOND GROUP ID | FIRST SIMILARITY | | | | | | | | | |
|---|---|---|---|---|---|---|---|---|---|---|---|---|---|
| | | | | 1 | 15 | 8 | 4 | 11 | 19 | 10 | 17 | 13 | 2 | 6 |
| | | | | 2-a | 2-a | 2-a | 2-a | 2-a | 2-a | TBD | TBD | TBD | TBD | TBD |
| 1 | | | 2-a | | 98% | 96% | 95% | 93% | 92% | 72% | 72% | 68% | 65% | 34% |
| 15 | | | 2-a | 98% | | 96% | 97% | 93% | 95% | 58% | 67% | 56% | 64% | 79% |
| 8 | | | 2-a | 96% | 96% | | 95% | 96% | 97% | 78% | 63% | 71% | 55% | 59% |
| 4 | | | 2-a | 95% | 97% | 95% | | 92% | 95% | 74% | 58% | 69% | 70% | 46% |
| 11 | 1-A | | 2-a | 93% | 93% | 96% | 92% | | 96% | 51% | 69% | 74% | 67% | 63% |
| 19 | | | 2-a | 92% | 95% | 97% | 95% | 96% | | 71% | 55% | 72% | 75% | 72% |
| 10 | | | TBD | 72% | 58% | 78% | 74% | 51% | 71% | | 67% | 69% | 97% | 95% |
| 17 | | | TBD | 72% | 67% | 63% | 58% | 69% | 55% | 67% | | 91% | 58% | 63% |
| 13 | | | TBD | 68% | 56% | 71% | 69% | 74% | 72% | 69% | 91% | | 71% | 54% |
| 2 | | | TBD | 65% | 64% | 55% | 70% | 67% | 75% | 97% | 58% | 71% | | 95% |
| 6 | | | TBD | 34% | 79% | 59% | 46% | 63% | 72% | 95% | 63% | 54% | 95% | |

| | | | | Image ID | 1 | 15 | 8 | 4 | 11 | 19 | 10 | 17 | 13 | 2 | 6 |
|---|---|---|---|---|---|---|---|---|---|---|---|---|---|---|---|
| | | | | First Group ID | | | | | 1-A | | | | | | |
| | | | | Second Group ID | 2-a | 2-a | 2-a | 2-a | 2-a | 2-a | TBD | TBD | TBD | TBD | TBD |
| Image ID | First Group ID | Second Group ID | First Similarity | | | | | | | First Similarity | | | | | |
| 1 | 1-A | 2-a | | | | 98% | 96% | 95% | 93% | 92% | 72% | 72% | 68% | 65% | 34% |
| 15 | 1-A | 2-a | | | 98% | | 96% | 97% | 93% | 95% | 58% | 67% | 56% | 64% | 79% |
| 8 | 1-A | 2-a | | | 96% | 96% | | 95% | 96% | 97% | 78% | 63% | 71% | 55% | 59% |
| 4 | 1-A | 2-a | | | 95% | 97% | 95% | | 92% | 95% | 74% | 58% | 69% | 70% | 46% |
| 11 | 1-A | 2-a | | | 93% | 93% | 96% | 92% | | 96% | 51% | 69% | 74% | 67% | 63% |
| 19 | 1-A | 2-a | | | 92% | 95% | 97% | 95% | 96% | | 71% | 55% | 72% | 75% | 72% |
| 10 | 1-A | TBD | *TBD* | | 72% | 58% | 63% | 74% | 51% | 71% | | 67% | 69% | *97%* | 95% |
| 17 | 1-A | TBD | *TBD* | | 72% | 67% | 71% | 58% | 69% | 55% | 67% | | 91% | 58% | 63% |
| 13 | 1-A | TBD | *TBD* | | 68% | 56% | 55% | 69% | 74% | 72% | 69% | 91% | | 71% | 54% |
| *2* | 1-A | TBD | *TBD* | | 65% | 64% | 70% | 67% | 63% | 75% | *97%* | 58% | 71% | | 95% |
| *6* | 1-A | TBD | *TBD* | | 34% | 79% | 59% | 46% | 63% | 72% | 95% | 63% | 54% | 95% | |

| IMAGE ID | 1 | 15 | 8 | 4 | 11 | 19 | 2 | 10 | 6 | 13 | 17 |
|---|---|---|---|---|---|---|---|---|---|---|---|
| FIRST GROUP ID | 1-A | | | | | | | | | | |
| SECOND GROUP ID | 2-a | 2-a | 2-a | 2-a | 2-a | 2-a | 2-b | 2-b | 2-b | 2-c | 2-c |
| FIRST SIMILARITY | | | | | | | | | | | |
| 2-a | | 98% | 96% | 95% | 93% | 92% | 65% | 72% | 34% | 68% | 72% |
| 2-a | 98% | | 96% | 97% | 93% | 95% | 64% | 58% | 79% | 56% | 67% |
| 2-a | 95% | 96% | | 97% | 96% | 97% | 55% | 78% | 59% | 71% | 63% |
| 2-a | 95% | 97% | 95% | | 92% | 95% | 70% | 74% | 46% | 69% | 58% |
| 2-a | 93% | 93% | 96% | 92% | | 96% | 67% | 51% | 63% | 74% | 69% |
| 2-a | 92% | 95% | 97% | 95% | 96% | | 75% | 71% | 72% | 72% | 55% |
| 2-b | 65% | 64% | 55% | 70% | 67% | 75% | | 97% | 95% | 71% | 58% |
| 2-b | 72% | 58% | 78% | 74% | 51% | 71% | 97% | | 95% | 69% | 67% |
| 2-b | 34% | 79% | 59% | 46% | 63% | 72% | 95% | 95% | | 54% | 63% |
| 2-c | 68% | 56% | 71% | 69% | 74% | 72% | 71% | 69% | 54% | | 91% |
| 2-c | 72% | 67% | 63% | 58% | 69% | 55% | 58% | 67% | 63% | 91% | |

| | | IMAGE ID | | | | | | | | | | |
|---|---|---|---|---|---|---|---|---|---|---|---|---|
| | | 1 | 15 | 8 | 4 | 11 | 19 | 2 | 10 | 6 | 13 | 17 |
| | FIRST GROUP ID | 1-A | | | | | | | | | | |
| | SECOND GROUP ID | 2-a | 2-a | 2-a | 2-a | 2-a | 2-a | 2-b | 2-b | 2-b | 2-c | 2-c |
| | AVERAGE VALUE OF FIRST SIMILARITIES IN BELONGING SECOND GROUP ID | AVERAGE VALUE IN 2-a | | | | | | AVERAGE VALUE IN 2-b | | | AVERAGE VALUE IN 2-c | |
| | | 94.8% | 95.8% | 96.0% | 94.8% | 94.0% | 95.0% | 96.0% | 96.0% | 95.0% | 91.0% | 91.0% |
| | FIRST SIMILARITY | | | | | | | | | | | |
| 1 | 2-a | | 98% | 96% | 95% | 93% | 92% | 65% | 72% | 34% | 68% | 72% |
| 15 | 2-a | 98% | | 96% | 97% | 93% | 95% | 64% | 58% | 79% | 56% | 67% |
| 8 | 2-a | 96% | 96% | | 95% | 96% | 97% | 55% | 78% | 59% | 71% | 63% |
| 4 | 2-a | 95% | 97% | 95% | | 95% | 95% | 70% | 74% | 46% | 69% | 58% |
| 11 | 2-a | 93% | 93% | 96% | 95% | | 97% | 55% | 51% | 63% | 74% | 69% |
| 19 | 2-a | 92% | 95% | 97% | 92% | 96% | | 70% | 74% | 46% | 69% | 58% |
| 2 | 2-b | 65% | 55% | 95% | 70% | 51% | 75% | | 97% | 95% | 72% | 69% |
| 10 | 2-b | 72% | 58% | 78% | 74% | 71% | 72% | 97% | | 95% | 69% | 67% |
| 6 | 2-b | 34% | 79% | 59% | 46% | 63% | 55% | 95% | 95% | | 54% | 63% |
| 13 | 2-c | 68% | 56% | 71% | 69% | 74% | 72% | 71% | 69% | 54% | | 91% |
| 17 | 2-c | 72% | 67% | 63% | 58% | 69% | 55% | 58% | 67% | 63% | 91% | |

| FIRST GROUP ID | SECOND GROUP ID | IMAGE ID | FACE-DETECTION LIKELIHOOD | AVERAGE VALUE OF FIRST SIMILARITIES IN BELONGING SECOND GROUP ID | COLOR HISTOGRAM | FEATURE VECTOR |
|---|---|---|---|---|---|---|
| 1-A | 2-a | 1 | 91% | 94.8% | histgram01 | vector01 |
| 1-A | 2-a | 15 | 97% | 95.8% | histgram15 | vector15 |
| 1-A | 2-a | 8 | 98% | 96.0% | histgram08 | vector08 |
| 1-A | 2-a | 4 | 95% | 94.8% | histgram04 | vector04 |
| 1-A | 2-a | 11 | 93% | 94.0% | histgram11 | vector11 |
| 1-A | 2-a | 19 | 94% | 95.0% | histgram19 | vector19 |
| 1-A | 2-b | 2 | 92% | 96.0% | histgram02 | vector02 |
| 1-A | 2-b | 10 | 97% | 96.0% | histgram10 | vector10 |
| 1-A | 2-b | 6 | 93% | 95.0% | histgram06 | vector06 |
| 1-A | 2-c | 13 | 92% | 91.0% | histgram13 | vector13 |
| 1-A | 2-c | 17 | 99% | 91.0% | histgram17 | vector17 |
| 1-B | 2-d | 3 | 85% | ... | histgram03 | vector03 |
| 1-B | 2-d | 5 | 88% | ... | histgram05 | vector05 |
| 1-B | 2-d | 9 | 83% | ... | histgram09 | vector09 |
| 1-B | 2-e | 14 | 84% | ... | histgram14 | vector14 |
| 1-B | 2-e | 16 | 82% | ... | histgram16 | vector16 |
| 1-B | 2-e | 20 | 81% | ... | histgram20 | vector20 |
| 1-C | 2-f | 7 | 77% | ... | histgram07 | vector07 |
| 1-C | 2-f | 12 | 75% | ... | histgram12 | vector12 |
| 1-C | 2-f | 18 | 73% | ... | histgram18 | vector18 |

FIG. 14

| IMAGE ID | 1 | 4 | 8 | 11 | 15 | 19 |
|---|---|---|---|---|---|---|
| FIRST GROUP ID | 1-A | | | | | |
| SECOND GROUP ID | 2-a | | | | | |
| SUB-SECOND GROUP ID | TBD | TBD | TBD | TBD | TBD | TBD |
| SECOND SIMILARITY | | 52% | 97% | 73% | *98%* | 62% |
| | 52% | | 57% | 72% | 63% | 95% |
| | 97% | 57% | | 68% | 96% | 59% |
| | 73% | 72% | 68% | | 63% | 68% |
| | *98%* | 63% | 96% | 63% | | 77% |
| | 62% | 95% | 59% | 68% | 77% | |

| IMAGE ID | 1 | 15 | 8 | 4 | 19 | 11 |
|---|---|---|---|---|---|---|
| FIRST GROUP ID | 1-A | | | | | |
| SECOND GROUP ID | 2-a | | | | | |
| SUB-SECOND GROUP ID | 2'-A' | 2'-A' | 2'-A' | 2'-B' | 2'-B' | 2'-C' |
| AVERAGE VALUE OF SECOND SIMILARITIES IN BELONGING SUB-SECOND GROUP ID | 97.5% | 97.0% | 96.5% | 95.0% | 95.0% | null |
| AVERAGE VALUE IN 2'-A' | AVERAGE VALUE IN 2'-B' | AVERAGE VALUE IN 2'-C' | | | | |

| | | SECOND SIMILARITY | | | | | |
|---|---|---|---|---|---|---|---|
| | | 2'-A' | 2'-A' | 2'-A' | 2'-B' | 2'-B' | 2'-C' |
| | 2'-A' | 98% | 98% | 97% | 52% | 62% | 73% |
| | 2'-A' | 97% | 96% | 96% | 63% | 77% | 63% |
| SECOND SIMILARITY | 2'-A' | 52% | 63% | 57% | 57% | 59% | 68% |
| | 2'-B' | 62% | 77% | 63% | 59% | 95% | 72% |
| | 2'-B' | 73% | 63% | 68% | 72% | 95% | 68% |
| | 2'-C' | | | | | | |

| IMAGE ID | FIRST GROUP ID | SECOND GROUP ID | SUB-SECOND GROUP ID |
|---|---|---|---|
| 1 | 1-A | 2-a | 2'-A' |
| 15 | | | 2'-A' |
| 8 | | | 2'-A' |
| 4 | | | 2'-B' |
| 19 | | | 2'-B' |
| 11 | | | 2'-C' |

| FIRST GROUP ID | SECOND GROUP ID | SUB-SECOND GROUP ID | IMAGE ID | FACE-DETECTION LIKELIHOOD | AVERAGE VALUE OF FIRST SIMILARITIES IN BELONGING SECOND GROUP ID | JUDGMENT ON FEATURE-VECTOR REPRESENTATIVE VALUE | AVERAGE VALUE OF SECOND SIMILARITIES IN BELONGING SECOND GROUP ID | COLOR HISTOGRAM | FEATURE VECTOR |
|---|---|---|---|---|---|---|---|---|---|
| 1-A | 2-a | 2'-A' | 1 | 91% | 94.8% | Yes | 97.5% | histgram01 | vector01 |
| 1-A | 2-a | 2'-A' | 15 | 97% | 95.8% | No | 97.0% | histgram15 | vector15 |
| 1-A | 2-a | 2'-A' | 8 | 98% | 96.8% | No | 96.5% | histgram08 | vector08 |
| 1-A | 2-a | 2'-B' | 4 | 95% | 94.8% | Yes | 95.0% | histgram04 | vector04 |
| 1-A | 2-a | 2'-B' | 19 | 94% | 95.0% | No | 95.0% | histgram19 | vector19 |
| 1-A | 2-a | 2'-C' | 11 | 93% | 94.0% | null | null | histgram11 | vector11 |
| 1-A | 2-b | 2'-D' | 2 | 92% | 96.0% | ... | ... | histgram02 | vector02 |
| 1-A | 2-b | 2'-D' | 6 | 93% | 95.0% | ... | ... | histgram06 | vector06 |
| 1-A | 2-b | 2'-E' | 10 | 97% | 96.0% | null | null | histgram10 | vector10 |
| 1-A | 2-c | 2'-F' | 13 | 92% | 91.0% | ... | ... | histgram13 | vector13 |
| 1-A | 2-c | 2'-F' | 17 | 99% | 91.0% | ... | ... | histgram17 | vector17 |
| 1-B | 2-d | 2'-G' | 3 | 85% | ... | ... | ... | histgram03 | vector03 |
| 1-B | 2-d | 2'-G' | 5 | 88% | ... | ... | ... | histgram05 | vector05 |
| 1-B | 2-d | 2'-H' | 9 | 83% | null | null | null | histgram09 | vector09 |
| 1-B | 2-e | 2'-I' | 14 | 84% | ... | ... | ... | histgram14 | vector14 |
| 1-B | 2-e | 2'-I' | 16 | 82% | ... | ... | ... | histgram16 | vector16 |
| 1-B | 2-e | 2'-I' | 20 | 81% | ... | ... | ... | histgram20 | vector20 |
| 1-C | 2-f | 2'-J' | 7 | 77% | ... | ... | ... | histgram07 | vector07 |
| 1-C | 2-f | 2'-J' | 12 | 75% | ... | ... | ... | histgram12 | vector12 |
| 1-C | 2-f | 2'-K' | 18 | 73% | null | null | null | histgram18 | vector18 |

FIG. 17

| FIRST GROUP ID | SECOND GROUP ID | SUB-SECOND GROUP ID | IMAGE ID | FACE-DETECTION LIKELIHOOD | AVERAGE VALUE OF FIRST SIMILARITIES IN BELONGING SECOND GROUP ID | JUDGMENT ON FEATURE-VECTOR REPRESENTATIVE VALUE | AVERAGE VALUE OF SECOND SIMILARITIES IN BELONGING SECOND GROUP ID | COLOR HISTOGRAM | FEATURE VECTOR |
|---|---|---|---|---|---|---|---|---|---|
| 1-A | 2-a | 2'-A' | 1 | 91% | 94.8% | No | 97.5% | histgram01 | vector01 |
| 1-A | 2-a | 2'-B' | 19 | 94% | 95.0% | Yes | 95.0% | histgram19 | vector19 |
| 1-A | 2-a | 2'-C' | 11 | 93% | 94.0% | No | null | histgram11 | vector11 |
| 1-A | 2-b | 2'-D' | 6 | 93% | 95.0% | No | … | histgram06 | vector06 |
| 1-A | 2-b | 2'-E' | 10 | 97% | 96.0% | Yes | null | histgram10 | vector10 |
| 1-A | 2-c | 2'-F' | 13 | 92% | 91.0% | Yes | … | histgram13 | vector13 |
| 1-B | 2-d | 2'-G' | 3 | 85% | … | No | … | histgram03 | vector03 |
| 1-B | 2-d | 2'-H' | 9 | 83% | null | Yes | null | histgram09 | vector09 |
| 1-B | 2-e | 2'-I' | 16 | 82% | … | Yes | … | histgram16 | vector16 |
| 1-C | 2-f | 2'-J' | 7 | 77% | … | No | … | histgram07 | vector07 |
| 1-C | 2-f | 2'-K' | 18 | 73% | null | Yes | null | histgram18 | vector18 |

170

IMAGE PROCESSING DEVICE, IMAGE PROCESSING METHOD, AND STORAGE MEDIUM STORING IMAGE PROCESSING PROGRAM

CROSS-REFERENCE TO RELATED APPLICATION

This application is based upon and claims the benefit of priority from the prior Japanese Patent Application No. 2012-231847 filed on Oct. 19, 2012, the entire contents of which are incorporated herein by reference.

FIELD

The embodiment discussed herein is related to, for example, an image processing device, an image processing method, and a computer-readable storage medium storing an image processing program used for continuous authentication of a user.

BACKGROUND

In recent years, information devices rapidly come into widespread use, and various types of information are held in the information devices accordingly. Hence, it is significant to establish security techniques that restrict, for example, leakage of the information held in the information devices. Various authentication techniques (for example, password authentication, biometric authentication, or card authentication) are suggested. However, in many cases, the existing authentication techniques each execute authentication processing only at a login and involve common problems. For example, if an unauthorized person maliciously uses an information device while an authorized user leaves an installation position of the information device, it is difficult to detect the malicious use.

To solve the problem, continuous authentication techniques that continuously perform authentication processing for users even after the login are suggested in, for example, F. Monrose, and A. D. Rubin, "Keystroke dynamics as biometrics for authentication", *Future Generation Comput. Syst.*, vol. 16, pp. 351-359, 2000, A. Altinok, and M. Turk, "Temporal integration for continuous multimodal biometrics", in *Proc. Workshop on Multimodal User Authentication*, pp. 131-137, 2003, and T. Sim, S. Zhang, R. Janakiraman, and S. Kumar, "Continuous verification using multimodal biometrics", *IEEE Trans. Pattern Anal. Mach. Intell.*, vol. 29, no. 4, pp. 687-700, April 2007. Representative continuous authentication may be face authentication using a feature vector. The face authentication is provided by registering a feature point group serving as a feature vector group of a face region corresponding to a user in an image, and detecting the user in the image based on the correspondence between the registered feature point group and a feature point group extracted at authentication.

Also, K. Niinuma, U. Park, and A. K. Jain, "Soft biometric traits for continuous user authentication", *IEEE Transactions on Information Forensics and Security (TIFS)*, Vol. 5, No. 4, pp. 771-780, 2, 2010 discloses color histogram authentication that uses a color histogram of an image in which a user is captured. The color histogram authentication may provide robust continuous authentication even when user's posture is changed, as compared with other system using face authentication and so forth. The color histogram authentication provides continuous authentication, for example, by registering a color histogram of a region (for example, a body region) corresponding to a user in an image, detecting the body region of the user in the image based on a similarity between the registered color histogram and a detected color histogram; and tracking movement of the body region.

SUMMARY

In accordance with an aspect of the embodiments, an image processing device includes, a processor; and a memory which stores a plurality of instructions, which when executed by the processor, cause the processor to execute, acquiring a captured image; extracting a first feature amount and a second feature amount of a user included in the image, and a third feature amount indicative of a likelihood of a portion from which the second feature amount is extracted; generating an authentication table including a plurality of the first feature amounts, a plurality of the second feature amounts, and a plurality of the third feature amounts extracted from a plurality of the images; and selecting the third feature amount extracted at authentication of the user, and the first feature amount and the second feature amount included in the authentication table, based on the third feature amount included in the authentication table, and authenticating the user based on the first feature amount and the second feature amount which are selected, and the first feature amount and the second feature amount which are extracted at the authentication.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 2 is a flowchart of authentication processing by the continuous authentication apparatus;

FIG. 3 is a flowchart of initial registration processing by the image processing device;

FIG. 4A is a conceptual diagram of a face region and a body region during extraction of a color histogram;

FIG. 4B is a table indicating an example of a data structure of the color histogram;

FIG. 4C is a conceptual diagram of the color histogram;

FIG. 6 is a table (No. 1) indicating an example of a data structure for generation of an authentication table;

FIG. 7 is a table (No. 2) indicating an example of a data structure for the generation of the authentication table;

FIG. 8 is a table (No. 3) indicating an example of a data structure for the generation of the authentication table;

FIG. 9 is a table (No. 4) indicating an example of a data structure for the generation of the authentication table;

FIG. 10 is a table (No. 5) indicating an example of a data structure for the generation of the authentication table;

FIG. 11 is a table (No. 6) indicating an example of a data structure for the generation of the authentication table;

FIG. 12 is a table (No. 7) indicating an example of a data structure for the generation of the authentication table;

FIG. 13 is a table (No. 8) indicating an example of a data structure for the generation of the authentication table;

FIG. 14 is a table (No. 9) indicating an example of a data structure for the generation of the authentication table;

FIG. 15 is a table (No. 10) indicating an example of a data structure for the generation of the authentication table;

FIG. 16 is a table (No. 11) indicating an example of a data structure for the generation of the authentication table;

FIG. 17 is a table indicating an example of a data structure of the authentication table;

DESCRIPTION OF EMBODIMENT

Embodiments of an image processing device, an image processing method, and an image processing program according to an embodiment are described below. The embodiments do not limit a disclosed technique.

Embodiment 1

Figure 1:
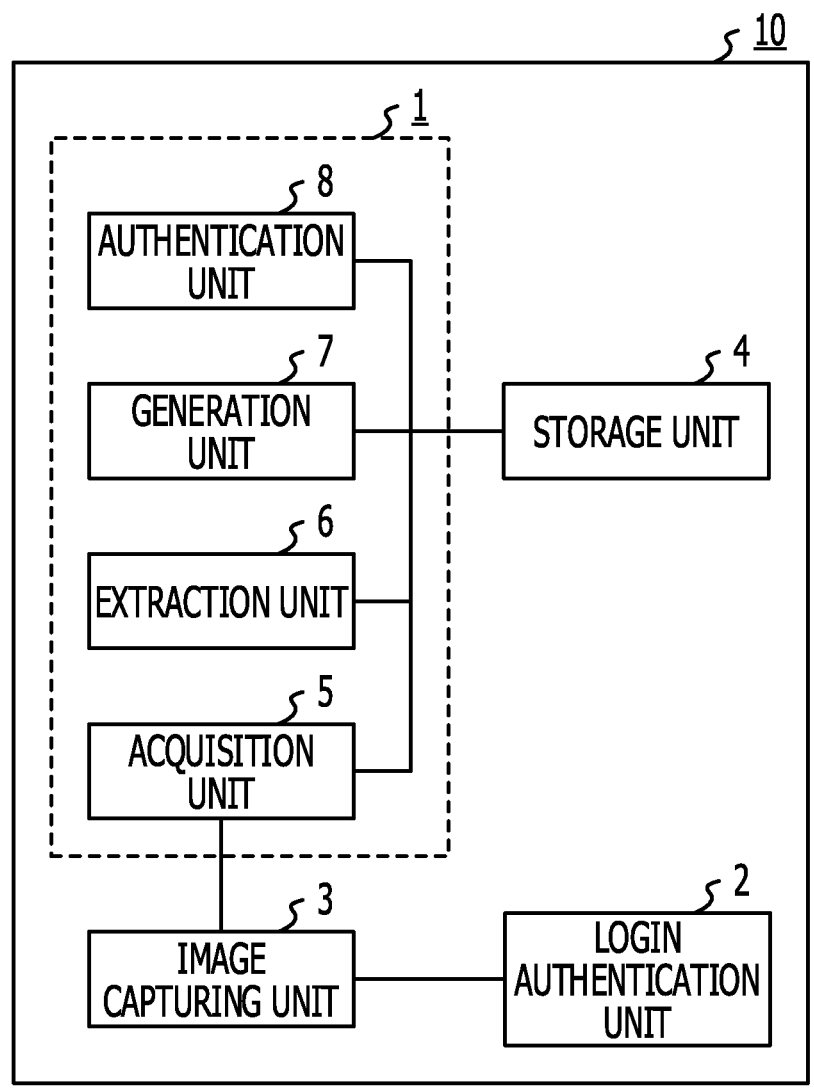
FIG. 1 is a functional block diagram of a continuous authentication apparatus including an image processing device according to an embodiment.

FIG. 1 is a functional block diagram of a continuous authentication apparatus 10 including an image processing device 1 according to the embodiment. The continuous authentication apparatus 10 includes the image processing device 1, a login authentication unit 2, an image capturing unit 3, and a storage unit 4. The image processing device 1 further includes an acquisition unit 5, an extraction unit 6, a generation unit 7, and an authentication unit 8.

The continuous authentication apparatus 10 performs authentication of a user who uses an information device, such as a personal computer (PC) or a mobile terminal. The continuous authentication apparatus 10 may be installed in or connected to an information device, such as a PC or a mobile terminal, which is used by a user. Alternatively, an information device itself may function as the continuous authentication apparatus 10. Still alternatively, a computer connected to an information device through a communication line may function as the continuous authentication apparatus 10. According to Embodiment 1, for example, the single continuous authentication apparatus 10 is applied to continuous authentication of client authentication type. However, the continuous authentication apparatus 10 may be applied to continuous authentication of server authentication type using a communication line. For example, if the continuous authentication of the server authentication type is performed, a server receives information and an image of a user to be used for login authentication processing (described later) from a client. The server may execute processing of various functions included in the continuous authentication apparatus 10, and the server may notify the client about an authentication result.

The login authentication unit 2 is, for example, a hardware circuit based on a wired logic. Alternatively, the login authentication unit 2 may be a functional module provided by a computer program executed by the continuous authentication apparatus 10. The login authentication unit 2 may execute login authentication processing of a user by applying any of known various authentication systems (for example, password authentication, biometric authentication, or card authentication).

The image capturing unit 3 is an image capturing device, such as a charge coupled device (CCD) or a complementary metal oxide semiconductor (CMOS) camera. The image capturing unit 3 uses, for example, an information device after the login authentication processing by the login authentication unit 2. The image capturing unit 3 captures an image including a face region or a body region at every certain time interval. The face region or the body region serves as a user region of a first user who is authorized or a second user who does not pass the login authentication processing and hence is unauthorized. The second user may be a person or a plurality of persons except the first user.

The storage unit 4 is, for example, a semiconductor memory element such as a flash memory, or a storage device, such as a hard disk drive (HDD) or an optical disc. The storage unit 4 is not limited to the above-described kinds of storage devices, and may be a random access memory (RAM) or a read only memory (ROM). The storage unit 4 stores, for example, various data, such as a color histogram and a feature vector, calculated by the image processing device 1 if desired. The storage unit 4 may not be included in the continuous authentication apparatus 10. The various data may be stored in, for example, a cashe or a memory (not illustrated) of any of respective functional units included in the image processing device 1. Alternatively, the storage unit 4 may be provided in an external device other than the continuous authentication apparatus 10 through a communication line by using a communication unit (not illustrated) provided in the image processing device 1.

The acquisition unit 5 is, for example, a hardware circuit based on a wired logic. Alternatively, the acquisition unit 5 may be a functional module provided by a computer program executed by the image processing device 1. The acquisition unit 5 acquires the image at every certain time interval, the image being obtained through the capturing by the image capturing unit 3. The acquisition unit 5 may receive an image from a device or a unit other than the image capturing unit 3. For example, the acquisition unit 5 may receive the image from an external device through a communication line by using a communication unit (not illustrated). In this case, the image capturing unit 3 may not be arranged in the continuous authentication apparatus 10.

The extraction unit 6 is, for example, a hardware circuit based on a wired logic. Alternatively, the extraction unit 6 may be a functional module provided by a computer program executed by the image processing device 1. The extraction unit 6 receives the image from the acquisition unit 5, and extracts a color histogram, which serves as a first feature amount, from a first region, which is a part of the user region of the first user or the second user included in the image. The first region represents, for example, the face region or both the face region and the body region of the user. The extraction unit 6 also extracts a feature vector, which serves as a second feature amount, from a second region, which is a part of the user region of the first user or the second user included in the image. The second region represents, for example, the face region of the user. The extraction unit 6 further extracts a third feature amount, which is a likelihood of a portion, from which the second feature amount is extracted, from the second region, which is the part of the user region of the first user or the second user included in the image. In other words, the extraction unit 6 extracts a face-detection likelihood, which represents a likelihood of a face, from the face region of the user. The face region of the user in the first region and the face region of the user in the second region may not match each other, and may be independent regions. The methods of extracting the color histogram serving as the first feature amount, the feature vector serving as the second feature amount, and the face-detection likelihood serving as the third feature amount by the extraction unit 6 are described later. For the convenience of description, the first feature amount is hereinafter referred to as color histogram, the second feature amount is hereinafter referred to as feature vector, and the third feature amount is hereinafter referred to as face-detection likelihood.

The generation unit 7 is, for example, a hardware circuit based on a wired logic. Alternatively, the generation unit 7 may be a functional module provided by a computer program executed by the image processing device 1. The generation unit 7 receives the color histogram, the feature vector, and the face-detection likelihood of the first user or the second user from the extraction unit 6. The generation unit 7 receives a plurality of the color histograms, a plurality of the feature vectors, and a plurality of the face-detection likelihoods, which are extracted by the extraction unit 6 from a plurality of the images captured at different image capturing times after the authentication of the first user, from the extraction unit 6. Then, the generation unit 7 generates an authentication table. The technical meaning of the authentication table, and the method of generating the authentication table by the generation unit 7 is described later.

The authentication unit 8 is, for example, a hardware circuit based on a wired logic. Alternatively, the authentication unit 8 may be a functional module provided by a computer program executed by the image processing device 1. The authentication unit 8 continuously authenticates the first user based on the authentication table generated by the generation unit 7. More specifically, the authentication unit 8 selects the color histogram serving as the first feature amount and the feature vector serving as the second feature amount included in the authentication table, based on the face-detection likelihood serving as the third feature amount extracted at the authentication of the first user and the face-detection likelihood serving as the third feature amount included in the authentication table. The authentication unit 8 continuously authenticates the first user based on the color histogram and feature vector which are selected, and the color histogram and feature vector which are extracted at the authentication. The detail of the continuous authentication flow by the authentication unit 8 is described later.

FIG. 2 is a flowchart of authentication processing by the continuous authentication apparatus 10. The authentication processing illustrated in FIG. 2 is executed when the user starts using the continuous authentication apparatus 10 or the information device connected to (or installed in) the continuous authentication apparatus 10. First, the login authentication unit 2 performs the login authentication processing (step S201). An authentication system in this login authentication processing may use any of known various authentication systems (for example, password authentication, biometric authentication, or card authentication). Then, the login authentication unit 2 judges whether or not the user is recognized as the first user, who is the authorized user, by the login authentication processing (step S202).

If the judgment on the login authentication is denied by the login authentication unit 2 (NO in step S202), the continuous authentication apparatus 10 ends the authentication processing. Accordingly, the second user other than the first user, who is the authorized user, is inhibited from using the continuous authentication apparatus 10 or the information device connected to the continuous authentication apparatus 10. In contrast, if the judgment on the login authentication is granted by the login authentication unit 2 (YES in step S202), the login authentication unit 2 activates the image processing device 1, and the image processing device 1 performs continuous authentication processing (step S203). The specific flow of the continuous authentication processing in step S203 is described later.

If the judgment on the continuous authentication is denied by the image processing device 1 (NO in step S204), lock processing is performed on the continuous authentication apparatus 10 or the information device connected to the continuous authentication apparatus 10 (step S206). For example, the lock processing performs temporal logout processing and hence allows the login authentication unit 2 to execute the login authentication processing again. Alternatively, the lock processing may cause the information device to be completely inoperable, and notify an administrator or another proper person with an alarm.

If the judgment on the continuous authentication is granted by the image processing device 1 (YES in step S204), the image processing device 1 waits for a certain period of time (step S205), and repetitively executes the continuous authentication processing (step S203). The certain period of time in step S205 may be set at any value with regard to robustness and so forth desired for the continuous authentication apparatus 10. For example, the certain period of time may be set at any of 30 seconds and 60 seconds.

By the processing indicated in the flowchart in FIG. 2, the user recognized as the first user who is the authorized user through the login authentication is able to use the continuous authentication apparatus 10 or the information device connected to the continuous authentication apparatus 10 while the image processing device 1 performs the continuous authentication processing.

Next, the specific flow of the continuous authentication processing executed by the image processing device 1 in step S203 in the authentication processing in FIG. 2 is described. FIG. 3 is a flowchart of initial registration processing by the image processing device 1. In step S203 of the continuous authentication processing in FIG. 2, the initial registration processing described in FIG. 3 is executed first.

First, the acquisition unit 5 sets an image acquisition number i of images acquired from the image capturing unit 3, at 1, which is an initial value (step S301). Then, the acquisition unit 5 acquires the image captured by the image capturing unit 3 (step S302). The extraction unit 6 receives the image from the acquisition unit 5, and detects the face of the first user included in the image (step S303). The detection for the face may use a desirable known method of, for example, a haar classifier or gabor wavelet transform disclosed in P. Violaand, and M. Jones, "Rapid object detection using a boosted cascade of simple features", in *Proc. IEEE Computer Vision and Pattern Recognition*, pp. I-511-I-518, 2001. The extraction unit 6 judges whether or not the face of the first user has been eligibly extracted (step S304).

During the image capturing by the image capturing unit 3, for example, if the first user moves and the image is blurred, and hence if eligibility for the face extraction of the first user is denied (NO in step S304), the image capturing unit 3 captures the image again, and then the acquisition unit 5 acquires the image (step S302). In step S304, if the eligibility for the face extraction of the first user is denied a certain number of times, the initial registration processing may be completed and then the lock processing in step S206 in FIG. 2 may be executed. In contrast, in FIG. 3, if the eligibility for the face extraction is granted (YES in step S304), the extraction unit 6 sets a certain shape (for example, a circular shape, an elliptic shape, or a rectangular shape) corresponding to the face of the first user, as the face region (step S305). Also, the extraction unit 6 sets a certain shape (for example, a rectangular shape, an elliptic shape, or a semicircular shape) corresponding to a part of the body of the first user, as the body region, in an area below the set face region (step S305). For example, the body region may be set to have a horizontal width that is twice the horizontal width of the face region and a vertical width that is equivalent to the vertical width of the face region.

Figures 5A, 5B:
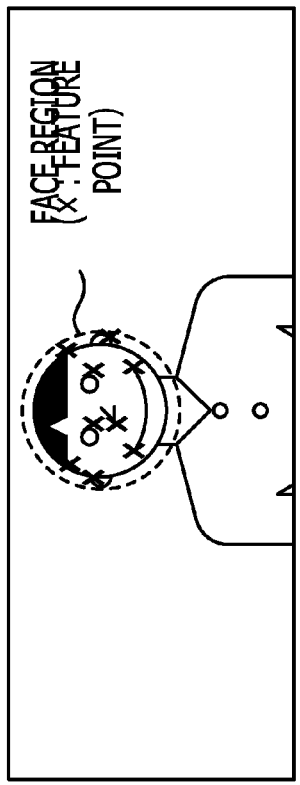
FIG. 5A is a conceptual diagram of a face region for extraction of a face-detection likelihood and a feature vector.
FIG. 5B is a table indicating an example of a data structure of feature vector information using the face-detection likelihood and feature points.

FIG. 4A is a conceptual diagram of the face region and the body region for the extraction of the color histogram. In an example illustrated in FIG. 4A, a circular face region and a rectangular body region are set. As illustrated in FIG. 4A, if the face region includes a head part, the feature amount includes the color of hairs of the user. Accordingly, accuracy on judgment for similarity using the color histogram may be increased. The extraction unit 6 may set any of the face region and the body region, as the first region for the extraction of the color histogram. Alternatively, with regard to uniqueness of fashion of the user, both the face region and the body region may be set as the first region for the extraction of the color histogram. FIG. 5A is a conceptual diagram of the face region for the extraction of the face-detection likelihood and the feature vector. In an example illustrated in FIG. 5A, the user detection region for the extraction of the face-detection likelihood and the feature vector is a circular face region.

In FIG. 3, the extraction unit 6 extracts the color histogram of the face region or the body region of the first user set in step S305 (step S306). If RGB levels of pixels in the image each have 256 gradations, the extraction unit 6 divides each component in the RGB color space into 16, so that subject pixels of the face region or the body region in the image have 16×16×16=4096 gradations. Now, when Vr (0 to 255) represents pixel values of R, a bin Vr' in which R is divided into 16 may be expressed by Expression (1) as follows.

$$Vr' = Vr \times 16/256 \quad (1)$$

A bin Vg' obtained by dividing G into 16 when Vg (0 to 255) represents pixel values of G, and a bin Vb' obtained by dividing B into 16 when Vb (0 to 255) represents pixel values of B may be calculated by a method similar to aforementioned Vr'. Thus, the detailed description is omitted. The extraction unit 6 uses the calculated bin Vr', bin Vg', and bin Vb', and hence calculates a pixel level V' of the 4096 gradations expressed by Expression (2) as follows.

$$V' = Vr' \times 16 \times 16 + Vg' \times 16 + Vb' \quad (2)$$

For each gradation of the 4096 gradations, the extraction unit 6 extracts a sequence of the sum of the pixels in the face region or the body region, as a color histogram. FIG. 4B is a table indicating an example of a data structure of the color histogram. FIG. 4B illustrates, for example, a data structure of the color histogram of the body region. A data structure of the color histogram of the face region may be expressed similarly to the data structure of the color histogram of the body region, and hence the detailed description is omitted. As indicated in FIG. 4B, the extraction unit 6 may store the shape of the body region and supplementary information such as positional information of the shape, as a region shape and positional information in a table if desired. In FIG. 4B, the shape is rectangular, and the center of the body region is located at coordinates (200, 200), when, for example, the upper left end of the image is the origin. FIG. 4B represents that the body region has a size with a width of 200 pixels and a height of 150 pixels. The color histogram (R, G, B) indicated by FIG. 4B represents a color histogram depending on ratios of colors within numerical ranges of the above-described bins Vr', Vg', and Vb'. For example, a color histogram (15, 15, 15) indicated in FIG. 4B represents that the ratio of the number of pixel of a color in the numerical range of (R, G, B)=(0, 0, 0) to (15, 15, 15) to the total number of pixels is 0.01=1%. The extraction unit 6 may use another color space (for example, HSV color space, CMK color space, YCbCr color space) other than the RGB color space when the extraction unit 6 extracts the color histogram.

FIG. 4C is a conceptual diagram of the color histogram. As illustrated in FIG. 4C, the extraction unit 6 may generate a normalized histogram in which the number of pixels is normalized with a desirable standard region size, with regard to that if the region size (the number of pixels included in the region) of a color histogram as a comparison subject is different, calculation processing for a similarity between different color histograms may be a troublesome work.

In FIG. 3, the extraction unit 6 stores the color histogram extracted in step S306, in the cashe or memory (not illustrated) of the generation unit 7, or in the storage unit 4 (step S307).

The extraction unit 6 extracts a feature vector by using an eigen face system that analyzes main components of face data of a user with respect to prepared eigen face data, from the face region of the first user, the eigen face system being disclosed in, for example, L. Sirovich, and M. Kirby, "Low-dimensional procedure for the characterization of human faces", *Journal of the Optical Society of America A* 4 (3), pp. 519-524, 1987 (step S308). The extraction unit 6 stores the feature vector in the cashe or memory (not illustrated) of the generation unit 7, or in the storage unit 4 (step S309). Alternatively, the extraction unit 6 may apply any known system, such as a fisher face system or an IPA system, other than the above-described eigen face system in step S307.

The extraction unit 6 extracts the face-detection likelihood of the first user from the face region of the first user, by using the above-described haar classifier or the gabor wavelet transform (step S310). The extraction unit 6 stores the face-detection likelihood in the cashe or memory (not illustrated) of the generation unit 7, or in the storage unit 4 (step S311).

The acquisition unit 5 increments the value of the image acquisition number i acquired from the image capturing unit 3 by one (step S312). The acquisition unit 5 judges whether the image acquisition number i is a predetermined image acquisition number n or larger (step S313). The predetermined image acquisition number n may be any number regarding the FAR. For example, the predetermined image acquisition number n may be 20. If the image acquisition number i is smaller than the predetermined image acquisition number n (NO in step S313), the image processing device 1 repeats the processing from step S302 to step S313. If the image acquisition number i is equal to or larger than the predetermined image acquisition number n (YES in step S313), the generation unit 7 generates an authentication table by using the plurality of color histograms, the plurality of feature vectors, and the plurality of face-detection likelihoods stored in the cashe or memory (not illustrated) of the generation unit 7 (step S314). When the generation unit 7 generates the authentication table, the initial registration processing indicated by the flowchart in FIG. 3 is ended. The specific method of generating the authentication table in step S314 is described later.

In FIG. 3, the image processing device 1 may execute the processing in step S306, step S308, and step S310 in a desirable order or in parallel. Also, in step S313, even if the image acquisition number i reaches the predetermined image acquisition number n or becomes larger, the acquisition unit 5 may acquire an image from the image capturing unit 3, the image acquired at the earliest time may be replaced with the newly acquired image, and the authentication table may be updated. Accordingly, a change in illumination condition due to sunshine duration, or a change in use environment may be reflected.

Also, in step S308 in FIG. 3, the extraction unit 6 may extract feature points by using a harris corner detector or the like other than the above-described eigen face system, and may extract a feature vector from the feature points. In this case, in step S308, the feature points to be extracted from the face region may be feature points from which a feature vector is calculated for each feature point called descriptor. A known feature point, such as a feature point of scale invariant feature transform (SIFT) or a feature point of speeded up robust features (SURF) may be used. The extraction method for the SIFT feature point may use, for example, a method disclosed in U.S. Pat. No. 6,711,293. The extraction method for the SURF may use, for example, a method disclosed in H. Bay, et. al., "SURF: Speeded up robust features", *Computer Vision AND Image Understanding*, Vol. 110, No. 3, pp. 346-359, 2008.

FIG. 5A represents an example of positions of feature points extracted in a face region. The position of a feature point is defined by a distance (x, y) from a reference position when the reference position of an image (for example, the upper left end of the image) serves as the origin. The direction is defined by the direction of the feature point with respect to the reference position. The feature vector is defined by a set of a plurality of feature amounts (for example, 128 dimensions) such as a color and a shape. FIG. 5B is a table indicating an example of a data structure of feature vector information using the face-detection likelihood and the feature point. As indicated in FIG. 5B, the extraction unit 6 may store the shape of the face region and supplementary information such as positional information of the shape, as a region shape and positional information in a table if desired. In the example indicated in FIG. 5B, the shape is circular, and the center of the face region is located at coordinates (200, 100), when the upper left end of the image is the origin. FIG. 5B represents that the face region has a size with a width of 100 pixels and a height of 150 pixels. The face-detection likelihood becomes a larger value as the face region of the first user faces the front, and becomes a lower value as the face region of the first user faces a direction such as a lateral direction other than the front. The face-detection likelihood is in a range from 0 to 100(%). Also, the feature vector in FIG. 5B has an ID of the feature vector extracted by the extraction unit 6, and information about a position, a direction, and so forth, in the image of the feature vector. The direction is defined by the direction of the feature point with respect to the reference position. The feature vector is defined by a set of a plurality of feature amounts (for example, 128 dimensions) such as a color and a shape. The feature vector may use any of various known feature amounts other than the above-described method. In Example 1, the feature vector is extracted from the face region of the user; however, a feature vector may be extracted from any other desirable region. Also, the face-detection likelihood may be extracted by using any of various known methods other than the face angle. For example, a likelihood using a feature vector used in the above-described eigen face system may be used as the face-detection likelihood.

Next, the method of generating the authentication table by the generation unit 7 in step S314 in FIG. 3 is described. FIG. 6 is a table (No. 1) indicating an example of a data structure for generation of an authentication table. A table 60 in FIG. 6 stores color histograms, feature vectors, and face-detection likelihoods extracted by the extraction unit 6, together with image IDs. The image IDs may be assigned on a time-series basis of acquisition of images by the acquisition unit 5. The authentication table and the tables for generating the authentication table are generated by the generation unit 7, and saved in the cashe or memory (not illustrated) of the generation unit 7, or in the storage unit 4.

The generation unit 7 makes classification into a first group set including a plurality of first groups, in accordance with the degree of the face-detection likelihood of the table 60 in FIG. 6 and a predetermined first threshold. For example, if the table 60 is classified into the first group set including the plurality of first groups with reference to the order of the degrees of the face-detection likelihoods when the first threshold is 10%, three first groups are generated in the table 60 in FIG. 6. FIG. 7 is a table (No. 2) indicating an example of a data structure for the generation of the authentication table. A table 70 in FIG. 7 is generated on the basis of the table 60 in FIG. 6. As indicated by the table 70 in FIG. 7, when the upper limit of the face-detection likelihood is 100% and the first threshold is 10%, if the face-detection likelihoods are classified into the first group set including the plurality of first groups, three first groups are generated (a group of 90% or higher, a group of 80% or higher, and 70% or higher, the face-detection likelihoods being classified on the basis of the first threshold of 10%). As indicated by the table 70 in FIG. 7, the generation unit 7 assigns a first group ID to each first group, and stores the table 70. In the table 70 in FIG. 7, the image IDs are sorted in the order of the degrees of the face-detection likelihoods. However, the image IDs may not be sorted because, if the first group ID is assigned, the image IDs may be associated with the first group. The sorting may be omitted similarly in the tables in FIGS. 7 to 17 (described later). Instead of using the percentage of the face-detection likelihood for the first threshold, the number of image IDs may be used for a threshold. Alternatively, the first threshold may be determined as a set of a plurality of thresholds. For example, a first group ID of 1-A may be generated while the first threshold is 10%, then the first threshold may be changed to 5%, and first group IDs of 1-B and 1-C may be generated.

The table 70 in FIG. 7 is classified into the first group set including the plurality of first groups based on the face-detection likelihood. Accordingly, by selecting one of the first groups based on the face-detection likelihood of the first user extracted at the authentication, and using a desirable color histogram and a feature vector belonging to the first group, the continuous authentication with increased availability and robustness may be performed. This may be because of that the color histograms and feature vectors extracted in a different direction of the face may be previously excluded from subjects of the authentication processing. In addition, the plurality of color histograms and feature vectors belonging to the selected first group are uniquely selected. The availability and robustness may be further increased. Accordingly, the generation unit 7 makes classification into a second group set belonging to one of the first group set and including a plurality of second groups. In Embodiment 1, a method of generating at least one second group from the first group with the group ID of 1-A of the table 70 in FIG. 7 is described.

The generation unit 7 makes classification into the second group by using the similarities among the color histograms associated with the image IDs, which belong to the first group and have the first group IDs of 1-A, and by using a predetermined second threshold. Now, calculation processing for the similarities among the color histograms is described. Calculation for the similarities among the color histograms may use any of various known methods. For example, a bhattacharyya distance may be used. The similarity calculation with the bhattacharyya distance may use a calculation method disclosed in, for example, T. Kailath, "The divergence and bhattacharyya distance measures in signal selection", *IEEE Transactions on Communication Technology* 15 (1), pp. 52-60, 1967. Also, as indicated in FIG. 4C, when the normalized color histogram is generated, if pu is a normalized histogram of a color histogram "histgram01" associated with an image ID 1, and qu is a normalized color histogram of a color histogram "histgram02" associated with an image ID 2, a similarity p may be calculated by using Expression (3) as follows.

$$\rho = \sum_{u=1} \sqrt{puqu} \quad (3)$$

If the generation unit 7 makes a judgment by combining similarities of color histograms of the face region and the body region, when Sface is the similarity of the color histogram of the face region and Sbody is the similarity of the color histogram of the body region, a total similarity Stotal may be calculated by Expression (4) as follows.

$$Stotal = t \times Sface + (1-t) \times Sbody \quad (4)$$

In this case, t is a weighting coefficient for the similarity Sface of the color histogram of the face region, and $0 \leq t \leq 1$ is established.

FIG. 8 is a table (No. 3) indicating an example of a data structure for the generation of the authentication table. A table 80 in FIG. 8 is generated on the basis of at least the table 70 in FIG. 7. In the table 80 in FIG. 8, first similarities indicative of the similarities of the color histograms calculated by the generation unit 7 are stored. In the table 80 in FIG. 8, second groups are not classified yet. Hence, a value of, for example, to be determined (TBD) is stored in the cell of the "Second group ID". In the table 80 in FIG. 8, a pair of an image ID 1 and an image ID 15 has a first similarity of 98%, which is the highest.

The generation unit 7 selects one of the pair of image IDs having the highest first similarity in the table 80 in FIG. 8. For example, the generation unit 7 selects the image ID 1, and sorts the image IDs in the order from the highest first similarity with respect to the color histogram "histgram01" associated with the image ID 1. The second threshold is determined as, for example, 90%, and an image ID set with a first similarity of 90% or larger with respect to the color histogram of the image ID 1 is determined as one second group.

FIG. 9 is a table (No. 4) indicating an example of a data structure for the generation of the authentication table. A table 90 in FIG. 9 is generated on the basis of at least the table 80 in FIG. 8. In the table 90 in FIG. 9, a second group ID 2-a, which is determined by the above-described method and is one second group belonging to the second group set.

Then, the generation unit 7 searches a pair of image IDs with the highest first similarity from pairs of image IDs in a remaining image ID set excluding the image ID set having the second group IDs classified into 2-a. FIG. 10 is a table (No. 5) indicating an example of a data structure for the generation of the authentication table. A table 100 in FIG. 10 is generated on the basis of at least the table 90 in FIG. 9. FIG. 11 is a table (No. 6) indicating an example of a data structure for the generation of the authentication table. A table 110 in FIG. 11 is generated on the basis of at least the table 100 in FIG. 10. In the table 100 in FIG. 10, a pair of an image ID 2 and an image ID 10 has a first similarity of 97%, which is the highest. As indicated in the table 110 in FIG. 11, the generation unit 7 selects one of a pair of image IDs with the highest first similarity, for example, the image ID 2, and sorts the image IDs in the order from the highest first similarity with respect to the color histogram associated with the image ID 2. The generation unit 7 classifies an image ID set with first similarities being 90% or higher, which is the second threshold, with respect to the color histogram associated with the image ID 2, into one second group. More specifically, 2-b is assigned as a second group ID. The above-described processing is repetitively executed until the number of remaining image IDs becomes two or less. Thus, the group classification of the second group set is executed. In the table 110 in FIG. 11, an image ID 13 and an image ID 17 are remaining two image IDs, and 2-c is assigned as a second group ID.

FIG. 12 is a table (No. 7) indicating an example of a data structure for the generation of the authentication table. A table 120 in FIG. 12 is generated on the basis of at least the table 110 in FIG. 11. As indicated in the table 120 in FIG. 12, the generation unit 7 calculates an average value in the second group of the first similarities of the image IDs belonging to a certain second group. For example, an average value in a second group ID 2-a is calculated by using first similarities of an image ID 1, an image ID 15, an image ID 8, an image ID 4, an image ID 11, and an image ID 19. The calculated average value is stored in, for example, the cell of "Average value of first similarities in belonging second group ID" in the table 120 in FIG. 12. As the image ID has the large average value, the image ID has an average color histogram in the second group to which the image ID belongs.

FIG. 13 is a table (No. 8) indicating an example of a data structure for the generation of the authentication table. A table 130 in FIG. 13 is generated on the basis of at least the table 120 in FIG. 12. The table 130 in FIG. 13 is classified into the first group set including the plurality of first groups based on the face-detection likelihood. Further, the table 130 is classified into the second group set including the plurality of second groups based on the first similarity indicative of similarity between color histograms. The color histogram associated with the image IDs belonging to the same second group have substantially equivalent face-detection likelihoods, and hence the color histogram may be affected by similar external factors. An external factor may be, for example, an illumination condition. In other words, external factors that affect the color histogram may be divided into the number of second groups. The different second groups belonging to the same first group may have different external factors.

Now, it is assumed that the table 130 in FIG. 13 is used as the authentication table. In this case, by selecting one of the first groups based on the face-detection likelihood of the first user extracted at the authentication, and using a desirable color histogram and a feature vector classified into the first group and belonging to the second group, the continuous authentication with increased availability and robustness may be performed. Further, the color histogram with the largest average value of the first similarity is uniquely selected with a preference from among the color histograms associated with the image IDs belonging to the second group. Accordingly, the continuous authentication with further increased availability and robustness may be performed. Since the color histogram with the large average value of the first similarity is the most average color histogram in the selected second group. The color histogram may be likely similar to a color histogram extracted at the authentication of the first user with the feature amount being changed by various external factors.

In addition, since the feature vector belonging to the selected second group is uniquely selected, the continuous authentication with further increased availability and robustness may be performed. Accordingly, the generation unit 7 makes classification into a sub-second group set belonging to one of the second group set and including a plurality of sub-second groups. In Embodiment 1, a method of generating at least one sub-second group from the second group with the second group ID of 2-a of the table 130 in FIG. 13 is described. It is to be noted that the sub-second group may be referred to as third group.

The generation unit 7 may make classification into the sub-second groups by using second similarities indicative of similarities among feature vectors associated with all image IDs belonging to the second group with the second group ID of 2-a, and by using a predetermined third threshold. Now, processing of calculating similarities of feature vectors is described. The similarities of the feature vectors may be calculated by using matching processing by typical corresponding-point search using a feature point set included in a feature vector "vector1" associated with the image ID 1 and a feature point set included in a feature vector "vector15" associated with the image ID 15. The generation unit 7 calculates, for example, a success rate of the corresponding-point search (the number of successful times of the corresponding-point search/the number of feature point sets×100) as a second similarity. Also, the generation unit 7 makes classification into the sub-second groups while the predetermined third threshold is 90%.

Extracted feature points may include part of feature points corresponding to a background region, depending on the actual face position of the first user when the feature points are extracted. With regard to this, individual reliabilities may be assigned to extracted individual feature points to judge the face region. The reliability may be assigned so that the reliability increases as the distance from the center of gravity of the feature point set decreases. When the face region is judged, only feature points with high reliabilities may be used, or weights may be applied to individual feature points in accordance with the reliabilities. Accordingly, judgment accuracy for the face region may be increased.

FIG. 14 is a table (No. 9) indicating an example of a data structure for the generation of the authentication table. A table 140 in FIG. 14 is generated on the basis of at least the table 130 in FIG. 13. In the table 140 in FIG. 14, second similarities indicative of similarities of feature vectors calculated by the generation unit 7 are stored. In the table 140 in FIG. 14, sub-second groups are not determined yet. Hence, a value of, for example, to be determined (TBD) is stored in the cell of the "Sub-second group ID". In the table 140 in FIG. 14, a pair of the image ID 1 and the image ID 15 has a second similarity of 98%, which is the highest.

The generation unit 7 selects one of the pair of image IDs having the highest second similarity in the table 140 in FIG. 14. For example, the generation unit 7 selects the image ID 1, and sorts the image IDs in the order from the highest second similarity with respect to the feature vector associated with the image ID 1. The third threshold is determined as, for example, 90%, and an image ID set with a second similarity of 90% or higher with respect to the feature vector of the image ID 1 is determined as one sub-second group.

FIG. 15 is a table (No. 10) indicating an example of a data structure for the generation of the authentication table. A table 150 in FIG. 15 is generated on the basis of at least the table 140 in FIG. 14. In the table 150 in FIG. 15, a sub-second group ID 2'-A', which is classified by the above-described method and is one second group belonging to the sub-second group set, is assigned. Then, the generation unit 7 searches a pair of image IDs with the highest second similarity from remaining pairs of image IDs excluding the image ID set classified into the sub-second group ID 2'-A'. In the table 150 in FIG. 15, a pair of an image ID 4 and an image ID 19 has a second similarity of 95%, which is the highest. Hence, as indicated in the table 150 in FIG. 15, the generation unit 7 selects the one image ID 4 of the pair with the highest second similarity, and sorts the image IDs in the order from the highest second similarity with respect to the image ID 4. Group classification is made so that the image ID set including the pair having the second similarity of 90% or higher, which is the third threshold, is one sub-second group ID 2'-B'.

The generation unit 7 repetitively executes the above-described processing until the group classification may not be performed, that is, until the number of remaining image IDs becomes less than two. Thus, the classification for the sub-second groups is made as indicated by the table 150 in FIG. 15. In the table 150 in FIG. 15, an image ID 11 is the remaining image ID being less than two, and 2'-C' is assigned as a sub-second group ID.

As indicated in the table 150 in FIG. 15, the generation unit 7 calculates an average value in the sub-second group of the second similarities of the image IDs belonging to a certain sub-second group. For example, the image ID 1 calculates the average value in the belonging second group by using the second similarities of the image ID 1, the image ID 15, and the image ID 8. The calculated average value is stored in, for example, the cell of "Average value of second similarities in belonging sub-second group ID" in the table 150 in FIG. 15. As the image ID has the large average value, the image ID has an average color histogram in the second group to which the image ID belongs. For example, if one image ID, such as the image ID with the sub-second group ID of 2'-C', forms a sub-second group, an average value is not calculated, and "null" indicative of a zero value is stored in the cell of "Average value of second similarities in belonging sub-second group ID".

FIG. 16 is a table (No. 11) indicating an example of a data structure for the generation of the authentication table. A table 160 in FIG. 16 is generated on the basis of at least the table 150 in FIG. 15. By using the methods described with reference to FIGS. 7 to 15, as indicated by the table 160 in FIG. 16, a set of plurality of image IDs is classified into the first group set, the second group set, and the sub-second group set. The generation unit 7 determines a representative image ID of the image IDs belonging to the sub-second group if desired. More specifically, an image ID with the largest average value of the second similarity is selected from each sub-second group. The selected image ID is determined as a representative image ID, and Yes is stored in the cell of "Judgment on feature-vector representative value". No is stored in each of image IDs other than the representative image ID. The generation unit 7 may delete a not-selected image ID and various data associated with the image ID if desired. Embodiment 1 provides an example with deletion.

For example, regarding the sub-second group ID of 2'-A', an image ID with the largest value of the cell of "Average value of second similarities in belonging sub-second group ID" is the image ID 1 (97.5%). Hence, the image ID 1 is determined as the representative image ID in the sub-second group 2'-A', and the remaining image ID 8 and the image ID 15 are deleted. Regarding the sub-second group ID of 2'-B', the values in the cells of "Average value of second similarities in belonging sub-second group ID" are the same values. Hence, the image ID 19 with a larger value of "Average value of first similarities in belonging second group ID" is determined as representative image data in the sub-second group 2'-B', and the remaining image ID 4 is deleted.

FIG. 17 is a table indicating an example of a data structure of the authentication table. A table 170 in FIG. 17 is generated on the basis of at least the table 160 in FIG. 16. In the table 170 in FIG. 17, the generation unit 7 determines a representative image ID for image IDs belonging to a second group. More specifically, an image ID with the largest average value of the first similarity is selected from each second group. The selected image ID is determined as a representative image ID, and Yes is stored in the cell of "Judgment on color-histogram representative value". No is stored in each of image IDs other than the representative image ID.

In this case, by selecting one of the first groups based on the face-detection likelihood of the first user extracted at the authentication with use of the table 170 in FIG. 17, and using a desirable color histogram and a feature vector classified into the first group and belonging to the second group, the continuous authentication with increased availability and robustness may be performed. Further, the color histogram with the largest average value of the first similarity is uniquely selected with a preference from among the color histograms associated with the image IDs belonging to the second group. Accordingly, the continuous authentication with further increased availability and robustness may be performed. Since the color histogram with the largest average value of the first similarity is the most average color histogram from among the selected second group. The color histogram may be likely similar to a color histogram extracted at the authentication of the first user with the feature amount being changed by various external factors. In addition, since the sub-second group belonging to the selected second group is selected and the feature vector belonging to the selected sub-second group is uniquely selected, the continuous authentication with further increased availability and robustness may be performed. This is because that the color histogram and the feature vector have different sensitivities to a change in feature amount to be extracted even with the same external factor.

Figure 18A:
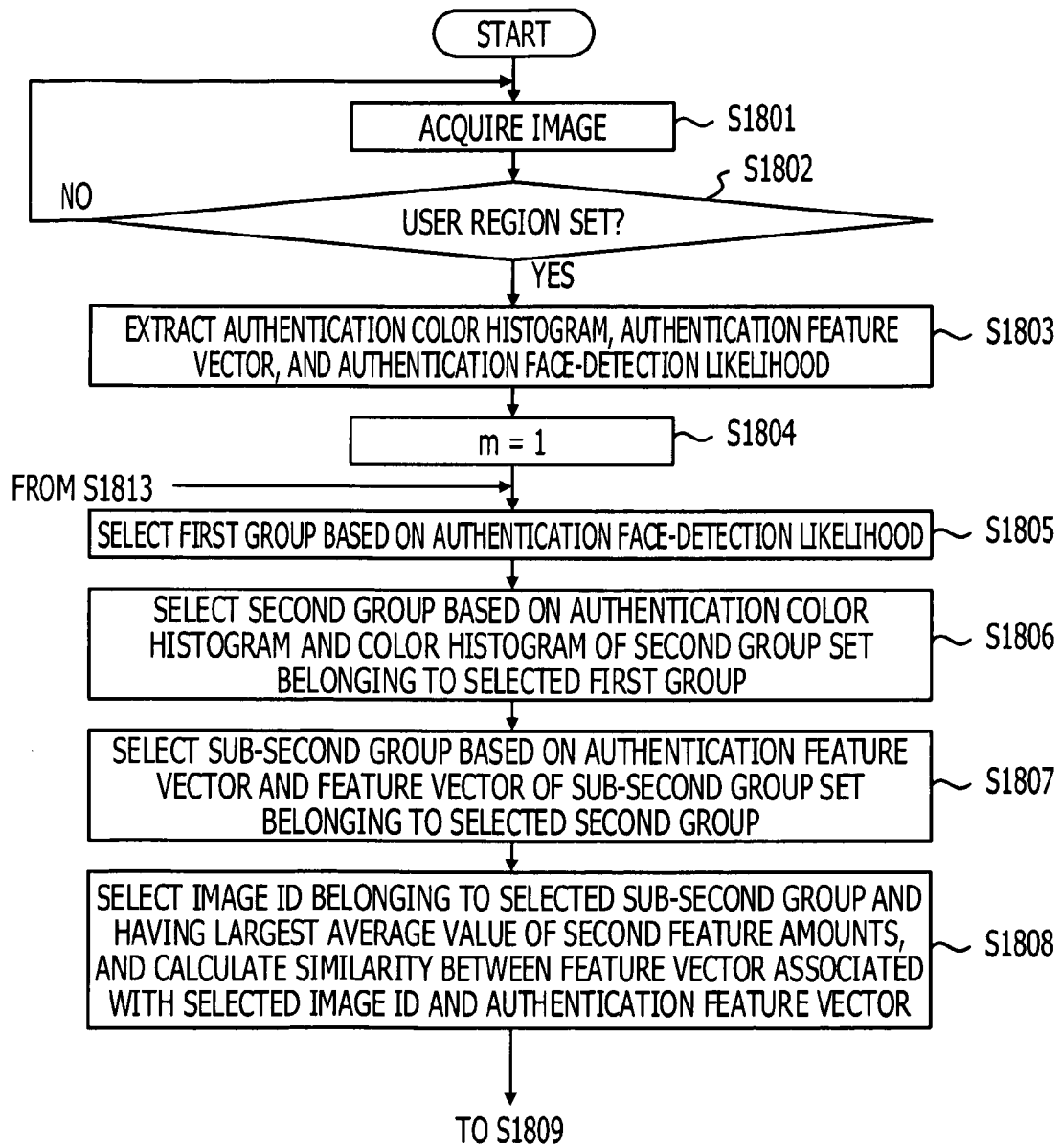
FIGS. 18A and 18B are flowcharts of continuous authentication processing by the image processing device.
Figure 18B:
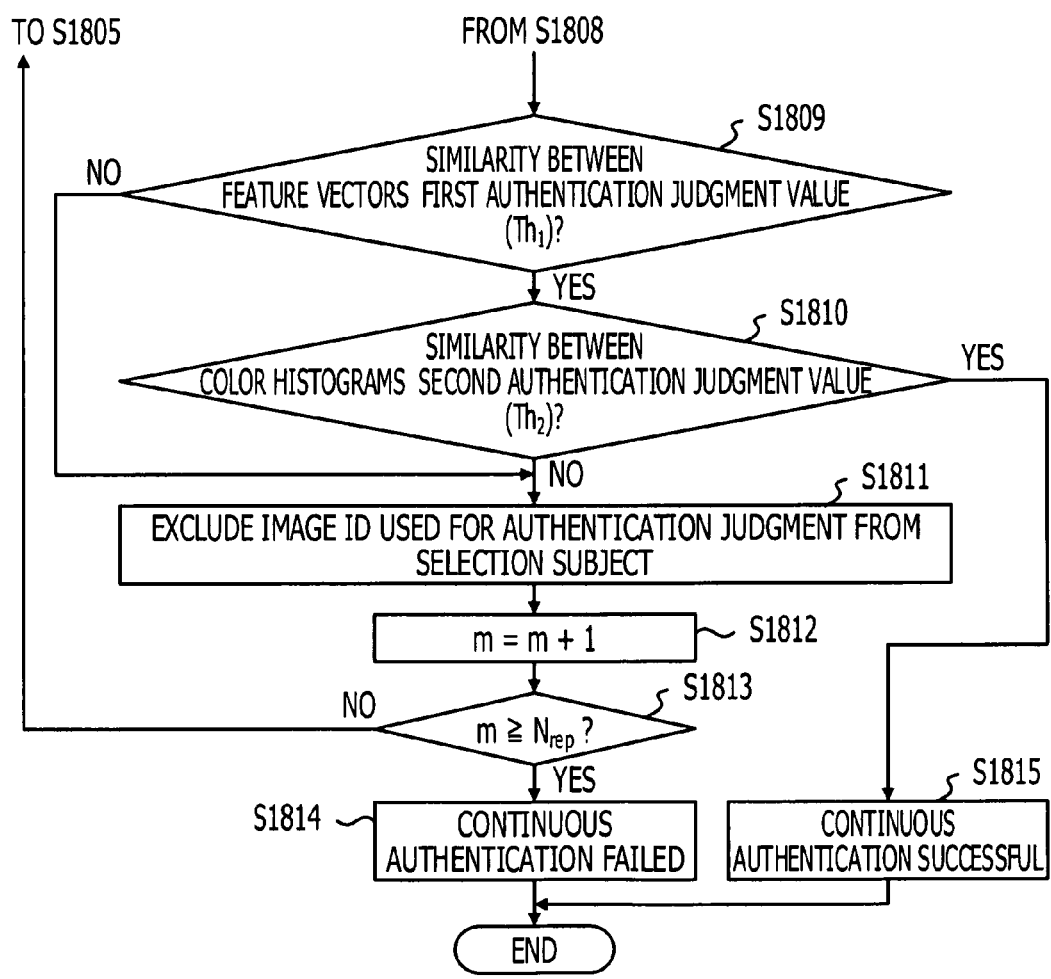

FIG. 18 is a flowchart of continuous authentication processing by the image processing device 1. This flow represents the specific flow of step S203 in FIG. 2. When processing flow in FIG. 18 is started, it is assumed that the generation unit 7 has generated the authentication table.

The acquisition unit 5 acquires an image captured by the image capturing unit 3 (step S1801). Then, the extraction unit 6 receives the image from the acquisition unit 5, and sets the face region and the body region, which are the user region of the first user included in the image. The face region and the body region may be detected by the methods similar to step S302 to step S304 in FIG. 3. In FIG. 18, the extraction unit 6 judges whether or not the user region of the first user is properly extracted (step S1802).

During the image capturing by the image capturing unit 3, if the first user moves and the image is blurred, and hence if eligibility for the user region setting of the first user is denied (NO in step S1802), the image capturing unit 3 captures an image again, and then the acquisition unit 5 acquires the image (step S1801). In step S1802, if the eligibility for the user region setting of the first user is denied a certain number of times, the lock processing in step S206 in FIG. 2 may be executed. In contrast, in FIG. 18, if the eligibility of the user region setting is granted (YES in step S1802), the extraction unit 6 extracts an authentication color histogram, an authentication feature vector, and an authentication face-detection likelihood from the user region (step S1803). The authentication color histogram may be extracted by a method similar to the method in step S306 in FIG. 3. The authentication feature vector may be extracted by a method similar to the method in step S308 in FIG. 3. The authentication face-detection likelihood may be extracted by a method similar to the method in step S310 in FIG. 3.

In FIG. 18, the authentication unit 8 sets an initial value of an authentication judgment number m to 1 (step S1804). The authentication unit 8 selects a first group from the authentication table based on the authentication face-detection likelihood (step S1805). For example, if the authentication face-detection likelihood is 93%, the generation unit 7 selects the first group ID 1-A in the table 170 in FIG. 17.

In FIG. 18, a second group is selected based on the authentication color histogram and a color histogram in a second group set belonging to the selected first group (step S1806). More specifically, the authentication unit 8 calculates a similarity of the authentication color histogram with respect to a color histogram associated with an image ID with "Yes" being stored in the cell of "Judgment on color-histogram representative value" indicated by the table 170 in FIG. 17. The authentication unit 8 selects the second group, to which an image ID having a color histogram with the highest similarity belongs. The similarity between the authentication histogram and the color histogram stored in the authentication table may be calculated by the above-described method of calculating the first similarity.

In FIG. 18, the authentication unit 8 selects a sub-second group based on the authentication feature vector and a feature vector in a sub-second group set belonging to the selected second group (step S1807). More specifically, the generation unit 7 calculates a similarity of the authentication feature vector with respect to a feature vector belonging to the selected second group indicated by the table 170 in FIG. 17. The generation unit 7 selects a sub-second group to which an image ID with the highest similarity belongs. The similarity between the authentication feature vector and the feature vector stored in the authentication table may be calculated by the above-described method of calculating the second similarity. Also, in the table 160 in FIG. 16, if the representative image ID of the image ID belonging to the sub-second group is determined when desired, and if the image ID belonging to the sub-second group is one image ID as indicated by the table 170 in FIG. 17, the authentication unit 8 may omit the step S1807.

The authentication unit 8 selects one image ID from the table 170 in FIG. 17 by executing the processing from step S1805 to S1808 in FIG. 18. The authentication unit 8 judges whether or not the similarity between the feature vector associated with the image ID and the authentication feature vector is a predetermined first authentication judgment value ($Th_1$) or larger (step S1809). The similarity between the feature vectors in step S1809 may use the similarity calculated in step S1808. The first authentication judgment value ($Th_1$) may be properly determined in accordance with authentication accuracy regarding the FRR and FAR desired for the image processing device 1, and may be, for example, 90%.

If the similarity between the feature vectors in step S1809 is equal to or larger than the first authentication judgment value ($Th_1$) (YES in step S1809), the authentication unit 8 judges whether or not a similarity between a color histogram associated with the image ID of the feature vector used in step S1809 and the authentication color histogram is equal to or larger than a predetermined second authentication judgment value ($Th_2$) (step S1810). The similarity between the color histograms in step S1810 may use the similarity calculated in step S1806. The second authentication judgment value ($Th_2$) may be properly determined in accordance with authentication accuracy regarding the FRR and FAR desired for the image processing device 1, and may be, for example, 95%.

If the similarity between the color histograms in step S1810 is equal to or larger than the second authentication judgment value ($Th_2$) (YES in step S1810), the authentication unit 8 judges that the continuous authentication is successful (step S1815). The image processing device 1 recognizes that the user included in the image is the first user, and ends the continuous authentication processing.

If the similarity between the feature vectors in step S1809 is smaller than the first authentication judgment value ($Th_1$) (NO in step S1809), or if the similarity between the color histograms in step S1810 is smaller than the second authentication judgment value ($Th_2$) (NO in step S1810), the authentication unit 8 excludes the image ID used for the authentication judgment in step S1809 or step S1810 from a selection subject of image IDs used for the continuous authentication processing (step S1811). Then, a value of the authentication judgment number m by one (step S1812).

The authentication unit 8 judges whether or not the authentication judgment number m is a repetitive authentication number $N_{rep}$ or larger (step S1813). If the authentication judgment number m is smaller than the authentication repetition number $N_{rep}$ (NO in step S1813), the authentication unit 8 repeats the processing from step S1805 to step S1813. If the authentication judgment number m is equal to or larger than the repetitive authentication number $N_{rep}$ (YES in step S1813), the authentication unit 8 judges that the continuous authentication is failed (step S1814). The image processing device 1 recognizes that the user included in the image is the second user, and ends the continuous authentication processing. If the repetitive authentication number $N_{rep}$ increases, the FRR decreases and the FAR increases. Also, if the repetitive authentication number $N_{rep}$ increases, the time for the continuous authentication processing and the calculation load for the continuous authentication processing increase. Hence, the repetitive authentication number $N_{rep}$ may be determined in accordance with the authentication accuracy and calculation performance desired for the image processing device 1, and may be, for example, five times.

As described above, in the image processing described in Embodiment 1, the continuous authentication with the increased availability and robustness may be performed. For example, if an image ID is randomly selected from the image ID 1 to the image ID 20 in the table 60 in FIG. 6 and authentication is performed as a comparative example, the probability of that a user is authenticated as an authorized user by one time is 1/20 (the number of image IDs)×100(%)=5%. In contrast, with the method disclosed in Embodiment 1, the first group is selected by using the face-detection likelihood being the third feature amount. Since the number of image IDs belonging to the first group is 11, the probability of that the user is authenticated as the authorized user by one time is 1/11 (the number of image IDs)×100(%)=9%. Further, since the second group is selected by using the color histogram being the first feature amount and the feature vector being the second feature amount and the continuous authentication is performed, the probability of that the user is authenticated as the authorized user by one time further increases. For example, in the authentication table 170 in FIG. 17, it is assumed that the image ID 6 satisfies the authentication conditions in step S1809 and step S1810 in FIG. 18. In this case, the authentication unit 8 selects the first group ID 1-A first. Then, the authentication unit 8 selects the second group ID 2-b with the highest similarity of the color histogram of the face. Then, if the authentication is performed, the probability of that the user is authenticated as the authorized user by one time is ½ (the number of image IDs)×100(%)=50%. Further, if the sub-second group is selected and the continuous authentication is performed, the user is authenticated as the authorized user by one time unless the processing is affected by a disturbance.

With the authentication table generated by the generation unit 7 disclosed in Embodiment 1, the group classification is made into the first group, the second group, and the sub-second group, depending on the external factors that respectively affect the respective groups. The number of groups is a minimum number of external factors that have to be considered under the use environment of the image processing device 1. Also, the representative image ID, which represents each external factor and which has a feature amount having the least similarity with respect to another representative image ID, may be selected. In other words, pieces of registered data with similar feature amounts may be omitted, and the number of image IDs registered in the authentication table may be minimized. Also, when the continuous authentication processing is executed, an increase in calculation load because similar feature amounts are used may be restricted.

Embodiment 2

Figure 19A:
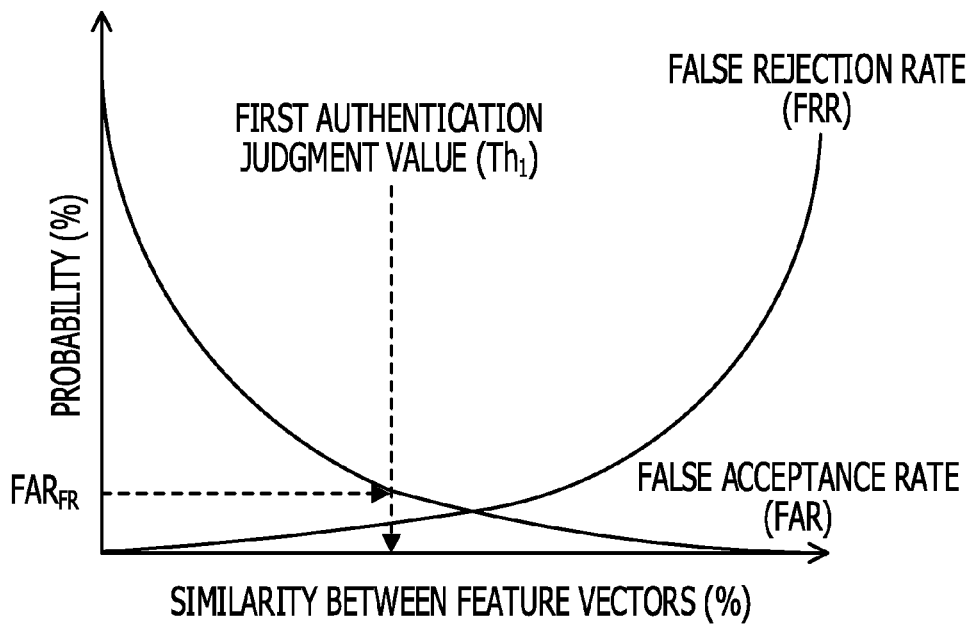
FIG. 19A is a relation diagram of a first authentication judgment value ($Th_1$) using a feature vector with respect to a false rejection rate (FRR) and a false acceptance rate (FAR) by feature vector authentication.

Embodiment 2 discloses the method of determining the first authentication judgment value ($Th_1$) in step S1809 in FIG. 18 in a further detailed manner. In Embodiment 2, it is assumed that the processing in step S1810 in FIG. 18 is not executed. As described above, the repetitive authentication number $N_{rep}$ has to be determined to satisfy the FRR and FAR which are determined as requirements of the image processing device 1. FIG. 19A is a relation diagram of the first authentication judgment value ($Th_1$) using the feature vector with respect to the false rejection rate (FRR) and the false acceptance rate (FAR) by the feature vector authentication. As indicated by FIG. 19A, the relationship between the FAR and FRR in the feature vector authentication is inverse proportion, and hence if one is determined, the other is determined. Hence, in Embodiment 2, a case of determining the FAR is described.

Whether the feature vector authentication is denied or granted (the judgment on the first user or the second user) is judged with reference to the similarity between the feature vectors. Hence, the FAR is determined by the first authentication judgment value ($Th_1$) used for the judgment. As it is found from FIG. 19A, when the first authentication judgment value ($Th_1$) is determined, the FRR is uniquely determined.

The repetitive authentication number $N_{rep}$ may be determined by Expression (5) as follows in correspondence with $FAR_{TH}$ which becomes the FAR determined as the requirement of the image processing device 1 and a design value $FAR_{FR}$ of the FAR per singe processing of the feature vector authentication.

$$N_{rep} = FAR_{TH}/FAR_{FR} \quad (5)$$

$FAR_{TH}$ is typically previously determined as a constant value for the requirement of the device. Hence, $N_{rep}$ and $FAR_{FR}$ are adjusted to satisfy Expression (5). $N_{rep}$ is, for example, an integer, and the upper limit of $N_{rep}$ is likely determined by the performance such as calculation performance of the image processing device 1. Hence, in Expression (5), $FAR_{FR}$ is adjusted. Providing a specific example, as desired specifications of the image processing device 1, if $FAR_{TH}$ is 1% and $N_{rep}$ is 5 times, $FAR_{FR}$ per single processing of the feature vector authentication is as follows.

$$FAR_{FR} = FAR_{TH}/N_{rep} = 1\%/5 \text{ times} = 0.2\%$$

The authentication unit 8 may determine the first authentication judgment value ($Th_1$) corresponding to this value from the relation diagram in FIG. 19A.

Embodiment 3

Figure 19B:
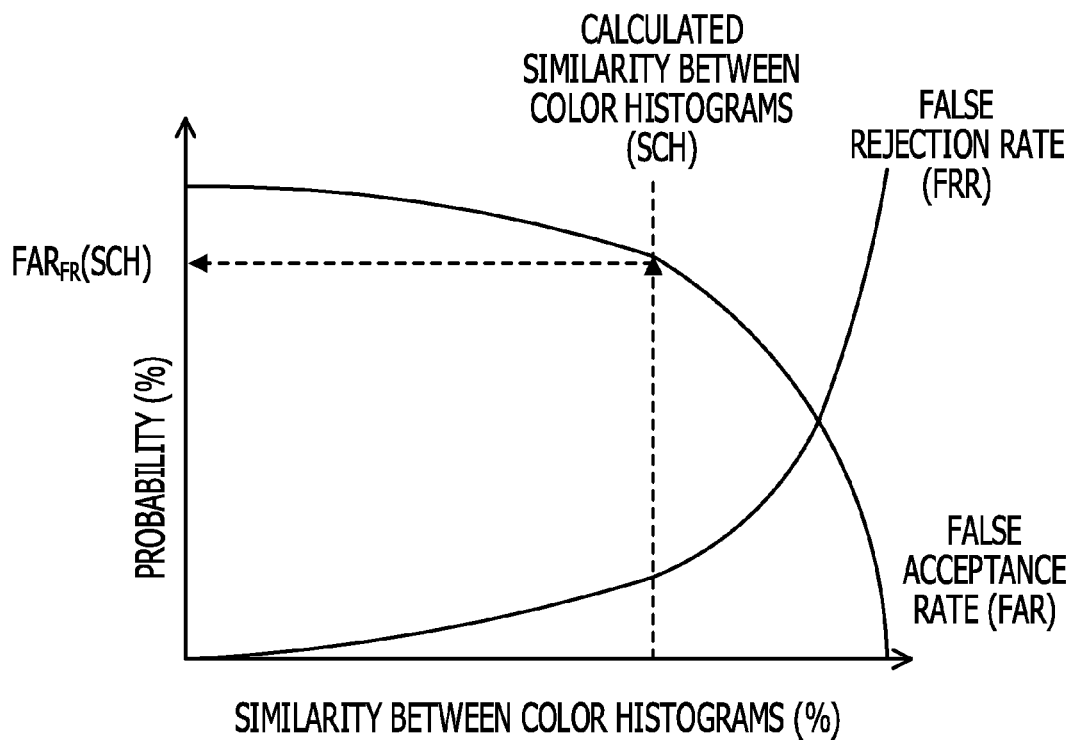
FIG. 19B is a relation diagram between a false rejection rate (FRR) and a false acceptance rate (FAR) by color histogram authentication.

In Embodiment 3, a method of determining the first authentication judgment value ($Th_1$) in step S1809 is described in a further detailed manner if the second authentication judgment value ($Th_2$) in step S1810 in FIG. 18 is used. FIG. 19B is a relation diagram between the false rejection rate (FRR) and the false acceptance rate (FAR) by the color histogram authentication. As indicated by FIG. 19B, the relationship between the FAR and FRR in the color histogram authentication is inverse proportion, and hence if one is determined, the other is determined. Also, the FAR in the color histogram authentication is typically larger than the FAR in the feature vector authentication; however, the FAR does not become 100%, and has identification performance by a certain degree. If the relationship between the FAR and FRR is already provided as indicated by FIG. 19B, by calculating similarity (SCH) between color histograms, the FAR corresponding to the similarity may be calculated as $FAR_{TH}$ (SCH). In this case, the $FAR_{FR}$ is adjusted as follows.

$$FAR_{FR}(SCH) = (FAR_{TH}/N_{rep})/FAR_{CH}(SCH) \quad (6)$$

The first authentication judgment value ($Th_1$) may be determined from the relation diagram in FIG. 19A to satisfy the $FAR_{FR}$ (SCH) adjusted by Expression (6).

By determining the first authentication judgment value ($Th_1$) as described above, the $FAR_{FR}$ (SCH) at the authentication using the feature vector may be increased while the entire $FAR_{TH}$ of the image processing device 1 is maintained. That is, even if the $FAR_{TH}$ is equivalent, since the entire false rejection rate FRR of the image processing device 1 may be decreased, the availability of the image processing device 1 may be increased. Expression (5) corresponds to Expression (6) when $FAR_{TH}$ (SCH)=1 (=100%).

A specific example according to Embodiment 3 is provided. For examples of desired specifications of the image processing device 1, $FAR_{TH}$=1% and $N_{rep}$ is 5 times. In this case, it is assumed that the FAR corresponding to the similarity of the authentication color histogram is already provided as $FAR_{TH}$ (SCH)=60%. In this case, the FAR that is allowed by the feature vector authentication according to Expression (6) is as follows.

$$FAR_{FR}(SCH) = (FAR_{TH}/N_{rep})/FAR_{CH}(SCH) = (1\%/5 \text{ times})/60\% = 0.33\%$$

This value represents that the desired performance of the FAR may be reduced only by 0.13% as compared with $FAR_{FR}$=0.2% according to Embodiment 2. If the FAR may be reduced, the FRR may be reduced correspondingly. The probability of that the authorized user is rejected may be reduced, and the availability may be increased.

Embodiment 4

Figure 20:
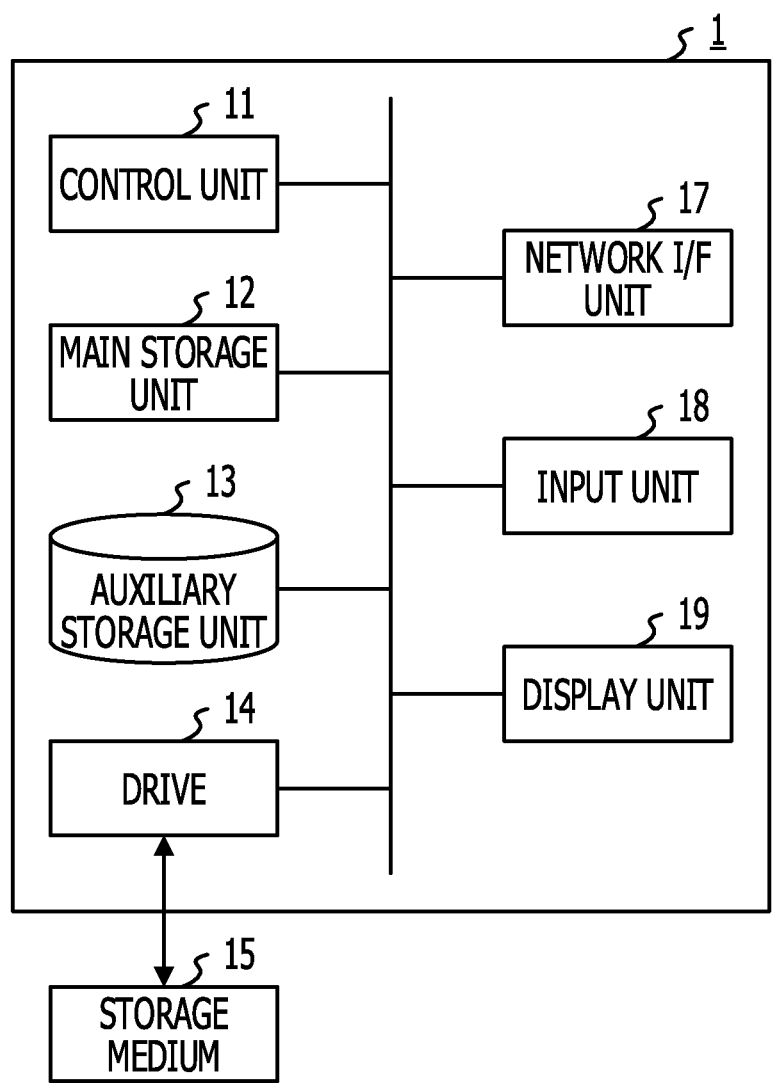
FIG. 20 is a hardware configuration diagram of a computer that functions as the image processing device according to the embodiment.

FIG. 20 is a hardware configuration diagram of a computer serving as the image processing device 1 according to the embodiment. As illustrated in FIG. 20, the image processing device 1 includes a control unit 11, a main storage unit 12, an auxiliary storage unit 13, a drive 14, a network interface (I/F) unit 17, an input unit 18, and a display unit 19. These configurations are connected to each other through a bus so that data may be transmitted and received.

The control unit 11 is a CPU that controls respective units, and calculates and processes data in a computer. The control unit 11 is an arithmetic unit that executes a program stored in the main storage unit 12 or the auxiliary storage unit 13. The control unit 11 receives data from the input unit 18 or a storage device, calculates and processes the data, and outputs the data to the display unit 19 or a storage device.

The main storage unit 12 is, for example, a ROM or a RAM. The main storage unit 12 is a storage device that stores or temporarily stores programs such as an operating system which is a system software executed by the control unit 11 and an application software, and data.

The auxiliary storage unit 13 is for example, a HDD. The auxiliary storage unit 13 is a storage device that stores data relating to the application software and so forth.

The drive 14 reads a program from a storage medium 15, for example, a flexible disk, and installs the program into the auxiliary storage unit 13.

Also, a predetermined program is stored in the storage medium 15, and the program stored in the storage medium 15 is installed in the image processing device 1 through the drive 14. The installed predetermined program may be executed by the image processing device 1.

The network I/F unit 17 is an interface between the image processing device 1 and a peripheral device which is connected through a network, such as a local area network (LAN) or a wide area network (WAN) constructed by a data transmission path such as a wired line and/or a wireless line, and which has a communication function.

The input unit 18 includes, for example, a cursor key, a key board having keys for numerical input and various functional keys, and a mouse or a slice pad for selecting a key on a display screen of the display unit 19. Also, the input unit 18 is a user interface with which a user gives an operation instruction to the control unit 11 and inputs data.

The display unit 19 is formed of, for example, a cathode ray tube (CRT) or a liquid crystal display (LCD). The display unit 19 provides displaying in accordance with display data input from the control unit 11.

The above-described image processing method may be provided as a program for causing a computer to execute. The above-described image processing method may be provided by installing this program from, for example, a server and by causing the computer to execute the program.

Also, the above-described image processing may be provided by recording the program in the storage medium 15 and causing a computer or a mobile terminal to read the storage medium 15 having the program recorded therein. The storage medium 15 may use any of various types of storage media, such as a storage medium having information optically, electrically, or magnetically recorded therein, such as a CD-ROM, a flexible disk, a magneto-optical disk; or a semiconductor memory having information electrically recorded therein, such as a ROM or a flash memory.

Also, the components of the illustrated devices and units do not have to be physically formed as illustrated. That is, specific forms of dispersion and integration of the devices and units are not limited to the illustrated forms, and the devices and units may be entirely or partly dispersed or integrated functionally or physically on a desirable unit basis, with regard to various loads or use conditions. Also, various processing described in the above examples may be provided by causing a computer, such as a personal computer or a workstation, to execute a prepared program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An image processing device comprising:
a processor; and
a memory which stores a plurality of instructions, which when executed by the processor, cause the processor to execute,
acquiring a plurality of captured images;
extracting, from each of the plurality of captured images, a first feature amount and a second feature amount of a user included in the captured image, and a third feature amount indicating a condition of acquiring of the captured image;
generating an authentication table including a plurality of templates, each of which corresponds to each of the plurality of the captured images, each of the templates including the first feature amount, the second feature amount, and the third feature amount extracted from each of the plurality of captured images;
acquiring an authentication image of a target user;
extracting the third feature amount from the authentication image of the target user;
selecting a template among the plurality of the templates by comparing the third feature amount of the authentication image and a plurality of third feature amounts included in the authentication table; and
authenticating the target user based on the first feature amount and the second feature amount which are included in the selected template, and the first feature amount and the second feature amount which are extracted from the authentication image.

2. The device according to claim 1,
wherein the first feature amount is a color histogram, and the second feature amount is a feature amount vector.

3. The device according to claim 1,
wherein the generating classifies the authentication table into a first group set including a plurality of first groups based on a degree of the third feature amount and a predetermined first threshold, and
wherein the authenticating selects a second group from a second group set belonging to one of the first group set and including a plurality of the second groups based on the third feature amount extracted at the authentication, and authenticates the target user based on the first feature amount and the second feature amount belonging to the selected second group, and the first feature amount and the second feature amount extracted at the authentication.

4. The device according to claim 3,
wherein the generating classifies the second group set into the plurality of second groups each belonging to the first group based on a first similarity between the plurality of first feature amounts and a predetermined second threshold, and a second similarity between the plurality of second feature amounts and a predetermined third threshold.

5. The device according to claim 4,
wherein the generating classifies one of the second groups based on the first similarity with respect to the first feature amount with the first similarity being maximum, and the second threshold, and classifies another one of the second groups based on the first similarity with respect to the first feature amount with the first similarity being maximum from among the plurality of first feature amounts not classified into the one second group, and the second threshold.

6. The device according to claim 4,
wherein the generating classifies one of the second groups based on the second similarity with respect to the second feature amount with the second similarity being maximum, and the third threshold, and classifies another one of the second groups based on the second similarity with respect to the second feature amount with the second similarity being maximum from among the plurality of second feature amounts not classified into the one second group, and the third threshold.

7. The device according to claim 3,
wherein the authenticating authenticates the target user by using the first feature amount with an average or a sum total of the first similarity being maximum, or the second feature amount with an average or a sum total of the second similarity being maximum in the second group.

8. The device according to claim 1,
wherein the authenticating excludes the selected first feature amount or the selected second feature amount from a selection subject of the authentication table when the target user is not authenticated, and repetitively performs the authentication based on a false acceptance rate determined as a requirement of the image processing device and a false acceptance rate per single authentication processing using the second feature amount.

9. The device according to claim 1,
wherein the authenticating excludes the selected first feature amount or the selected second feature amount from a selection subject of the authentication table when the target user is not authenticated, and repetitively performs the authentication based on a false acceptance rate determined as a requirement of the image processing device and a false acceptance rate per single authentication processing using the first feature amount.

10. An image processing method comprising:
acquiring a plurality of captured images;
extracting, from each of the plurality of captured images, a first feature amount and a second feature amount of a user included in the captured image, and a third feature amount indicating a condition of acquiring of the captured image;
generating, by a computer processor, an authentication table including a plurality of templates, each of which corresponds to each of the plurality of the captured images, each of the templates including the first feature amount, the second feature amount, and the third feature amount extracted from each of the plurality of captured images;
acquiring an authentication image of a target user;
extracting the third feature amount from the authentication image of the target user;
selecting a template among the plurality of the templates by comparing the third feature amount of the authentication image and a plurality of third feature amounts included in the authentication table; and
authenticating the target user based on the first feature amount and the second feature amount which are included in the selected template, and the first feature amount and the second feature amount which are extracted from the authentication image.

11. The method according to claim 10,
wherein the first feature amount is a color histogram, and the second feature amount is a feature amount vector.

12. The method according to claim 10,
wherein the generating classifies the authentication table into a first group set including a plurality of first groups based on a degree of the third feature amount and a predetermined first threshold, and
wherein the authenticating selects a second group from a second group set belonging to one of the first group set and including a plurality of the second groups based on the third feature amount extracted at the authentication, and authenticates the target user based on the first feature amount and the second feature amount belonging to the selected second group, and the first feature amount and the second feature amount extracted at the authentication.

13. The method according to claim 12,
wherein the generating classifies the second group set into the plurality of second groups each belonging to the first group based on a first similarity between the plurality of first feature amounts and a predetermined second threshold, and a second similarity between the plurality of second feature amounts and a predetermined third threshold.

14. The method according to claim 13,
wherein the generating classifies one of the second groups based on the first similarity with respect to the first feature amount with the first similarity being maximum, and the second threshold, and classifies another one of the second groups based on the first similarity with respect to the first feature amount with the first similarity being maximum from among the plurality of first feature amounts not classified into the one second group, and the second threshold.

15. The method according to claim 13,
wherein the generating classifies one of the second groups based on the second similarity with respect to the second feature amount with the second similarity being maximum, and the third threshold, and classifies another one of the second groups based on the second similarity with respect to the second feature amount with the second similarity being maximum from among the plurality of second feature amounts not classified into the one second group, and the third threshold.

16. The method according to claim 12,
wherein the authenticating authenticates the user by using the first feature amount with an average or a sum total of the first similarity being maximum, or the second feature amount with an average or a sum total of the second similarity being maximum in the second group.

17. The method according to claim 10,
wherein the authenticating excludes the selected first feature amount or the selected second feature amount from a selection subject of the authentication table when the target user is not authenticated, and repetitively performs the authentication based on a false acceptance rate determined as a requirement of the image processing device and a false acceptance rate per single authentication processing using the second feature amount.

18. The method according to claim 10,
wherein the authenticating excludes the selected first feature amount or the selected second feature amount from a selection subject of the authentication table when the target user is not authenticated, and repetitively performs the authentication based on a false acceptance rate determined as a requirement of the image processing device and a false acceptance rate per single authentication processing using the first feature amount.

19. A non-transitory computer-readable storage medium storing an image processing program that causing a computer to execute a process comprising:
acquiring a plurality of captured images;
extracting, from each of the plurality of captured images, a first feature amount and a second feature amount of a user included in the captured image, and a third feature amount indicating a condition of acquiring of the captured image;
generating an authentication table including a plurality of templates, each of which corresponds to each of the plurality of the captured images, each of the templates including the first feature amount, the second feature amount, and the third feature amount extracted from each of the plurality of captured images;
acquiring an authentication image of a target user;
extracting the third feature amount from the authentication image of the target user;
selecting a template among the plurality of the templates by comparing the third feature amount of the authentication image and a plurality of third feature amounts included in the authentication table; and
authenticating the target user based on the first feature amount and the second feature amount which are included in the selected template, and the first feature amount and the second feature amount which are extracted from the authentication image.

20. The device according to claim 1, wherein the third feature amount indicates an orientation of the user in the captured image.

* * * * *